Oct. 1, 1940.   H. L. PITMAN   2,216,627
COMBINED TYPEWRITING AND COMPUTING MACHINE
Filed April 9, 1937   9 Sheets-Sheet 7
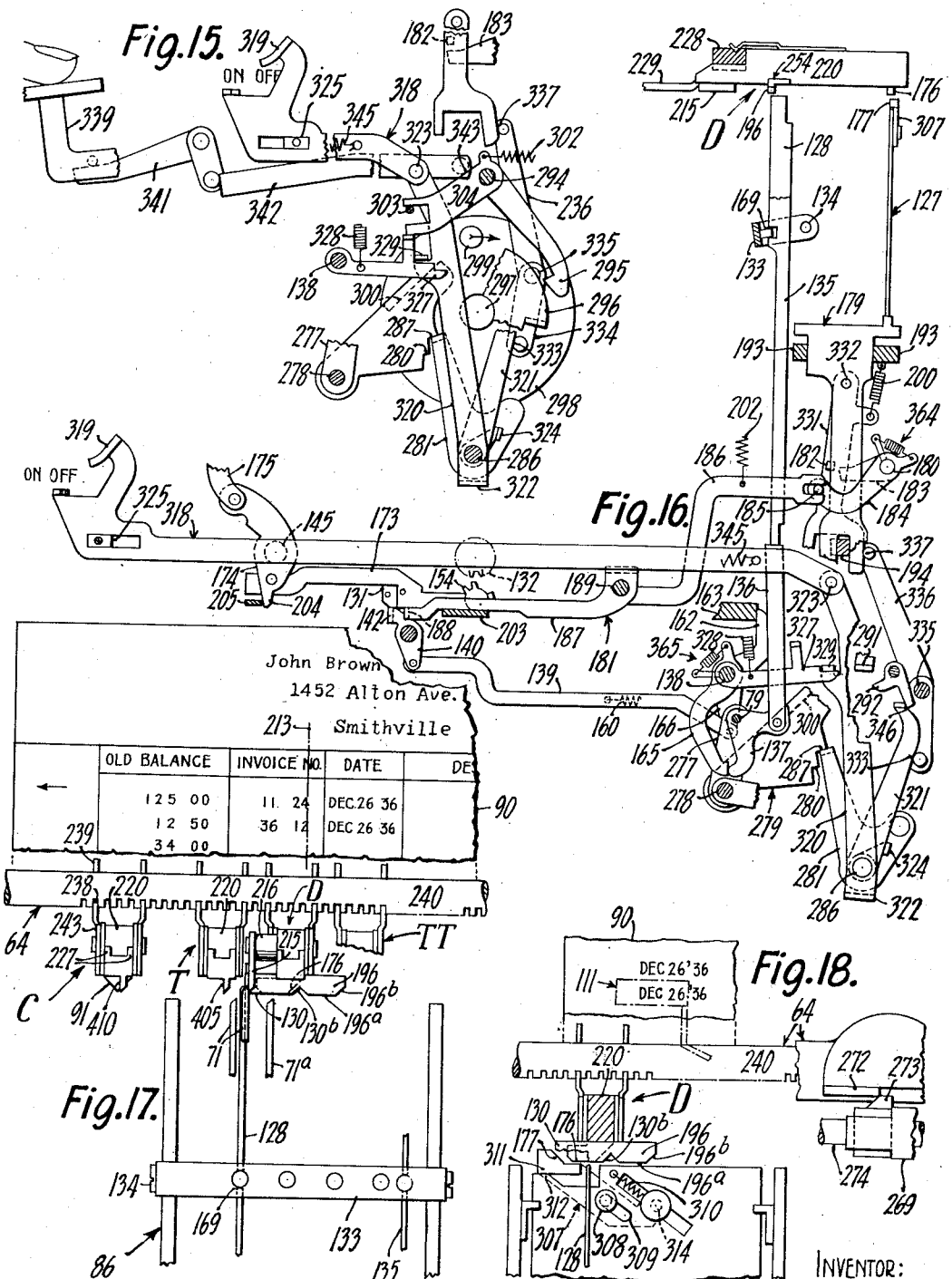
INVENTOR:
Henry L. Pitman
BY B. C. Stickney
ATTORNEY.

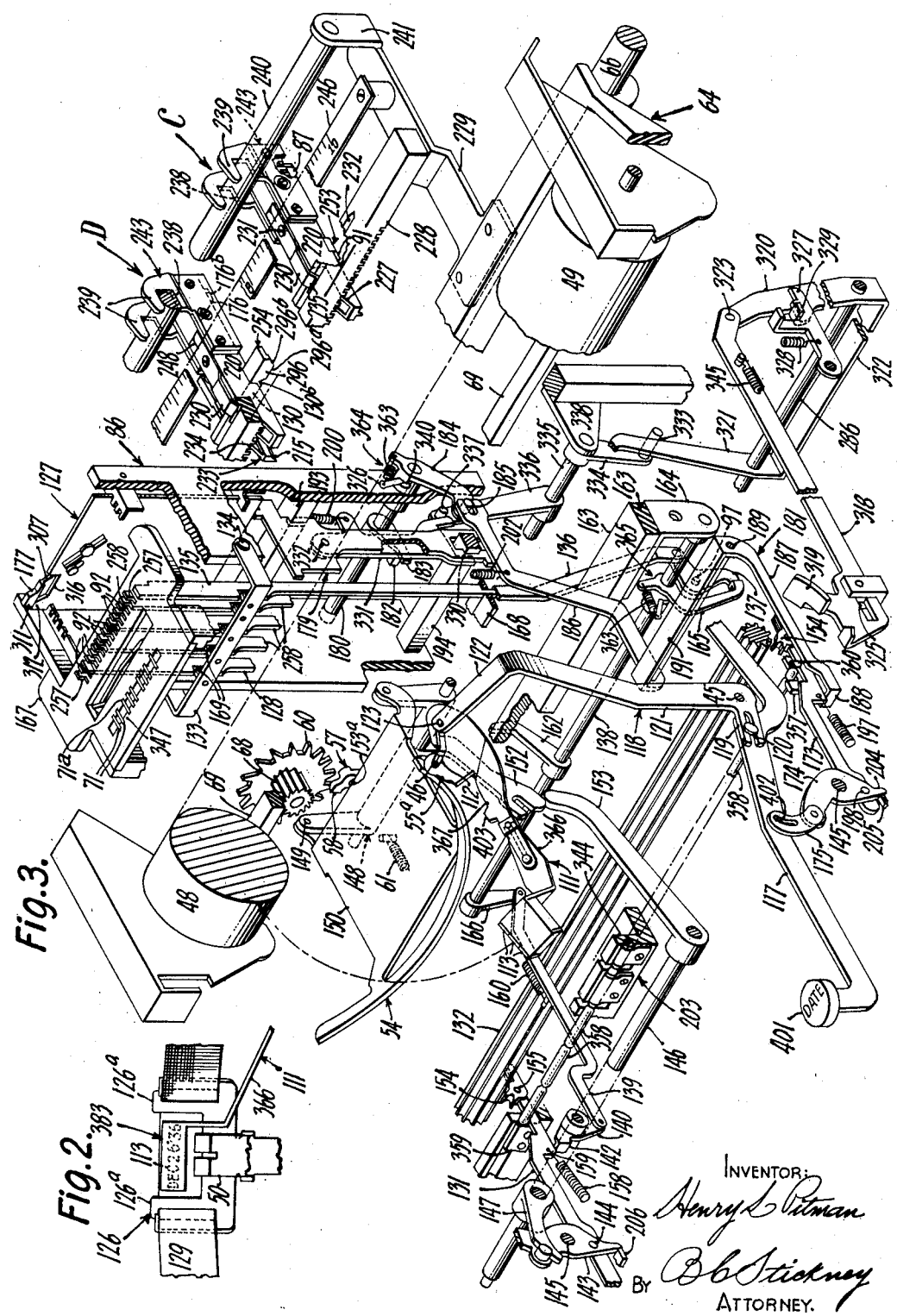

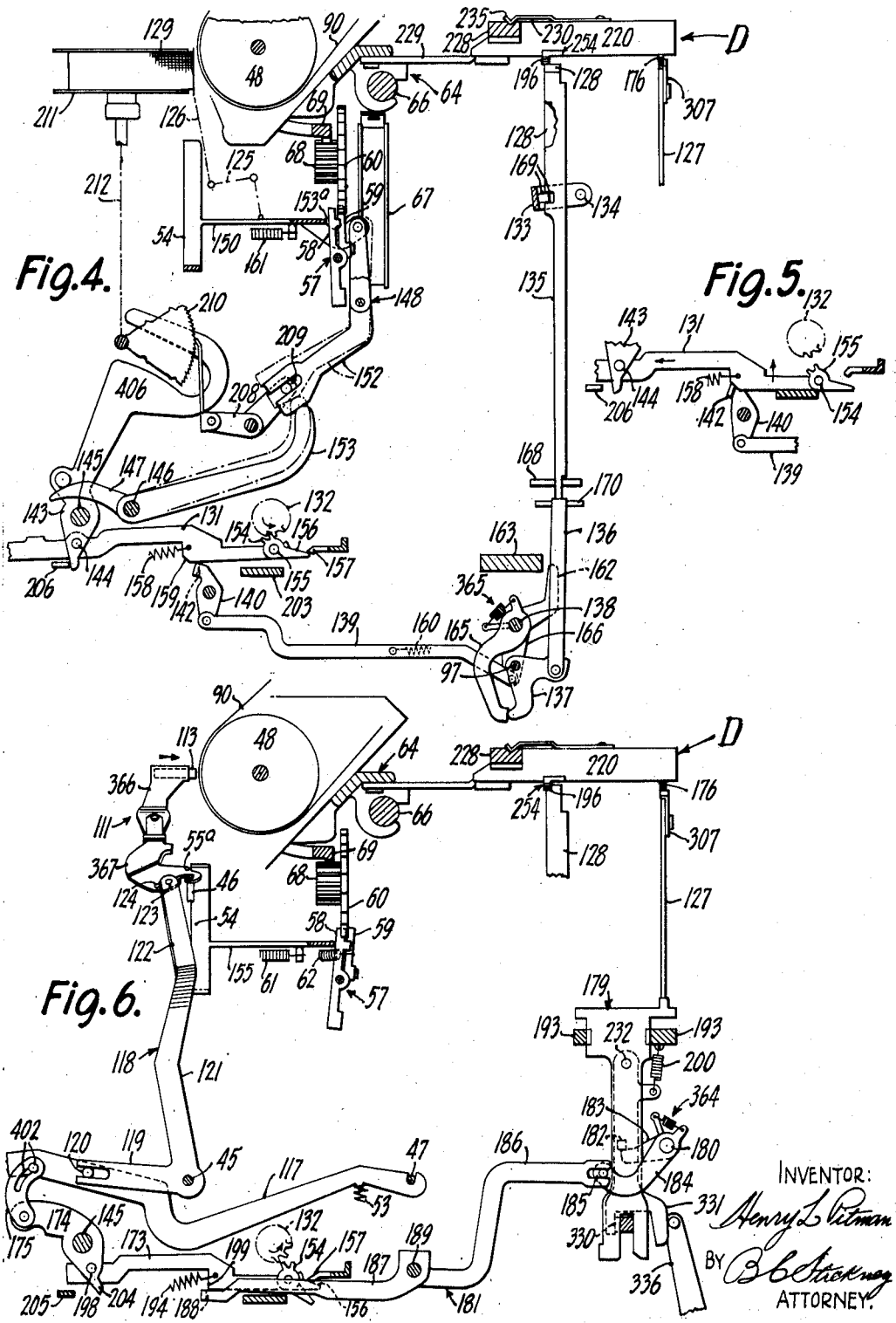

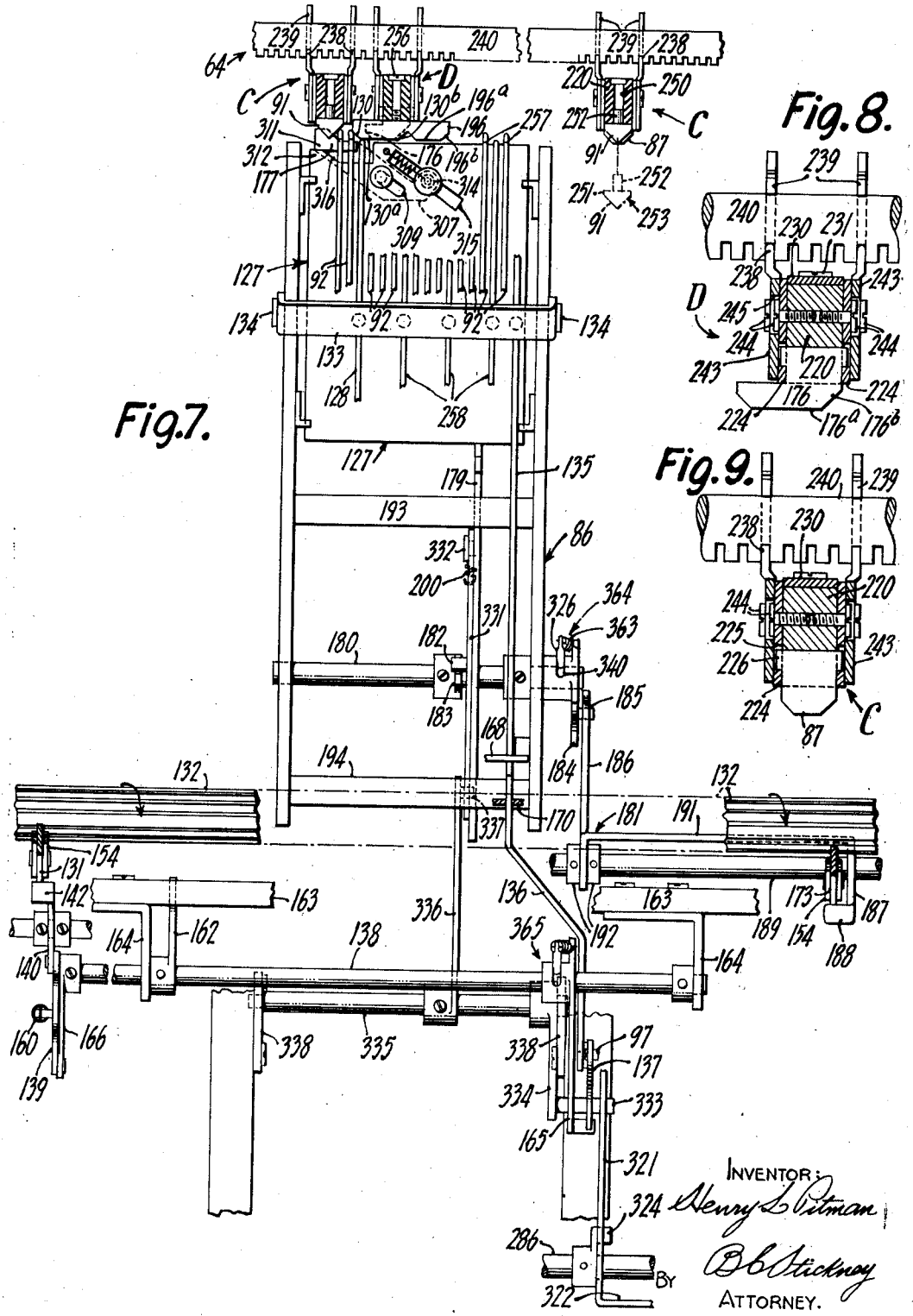

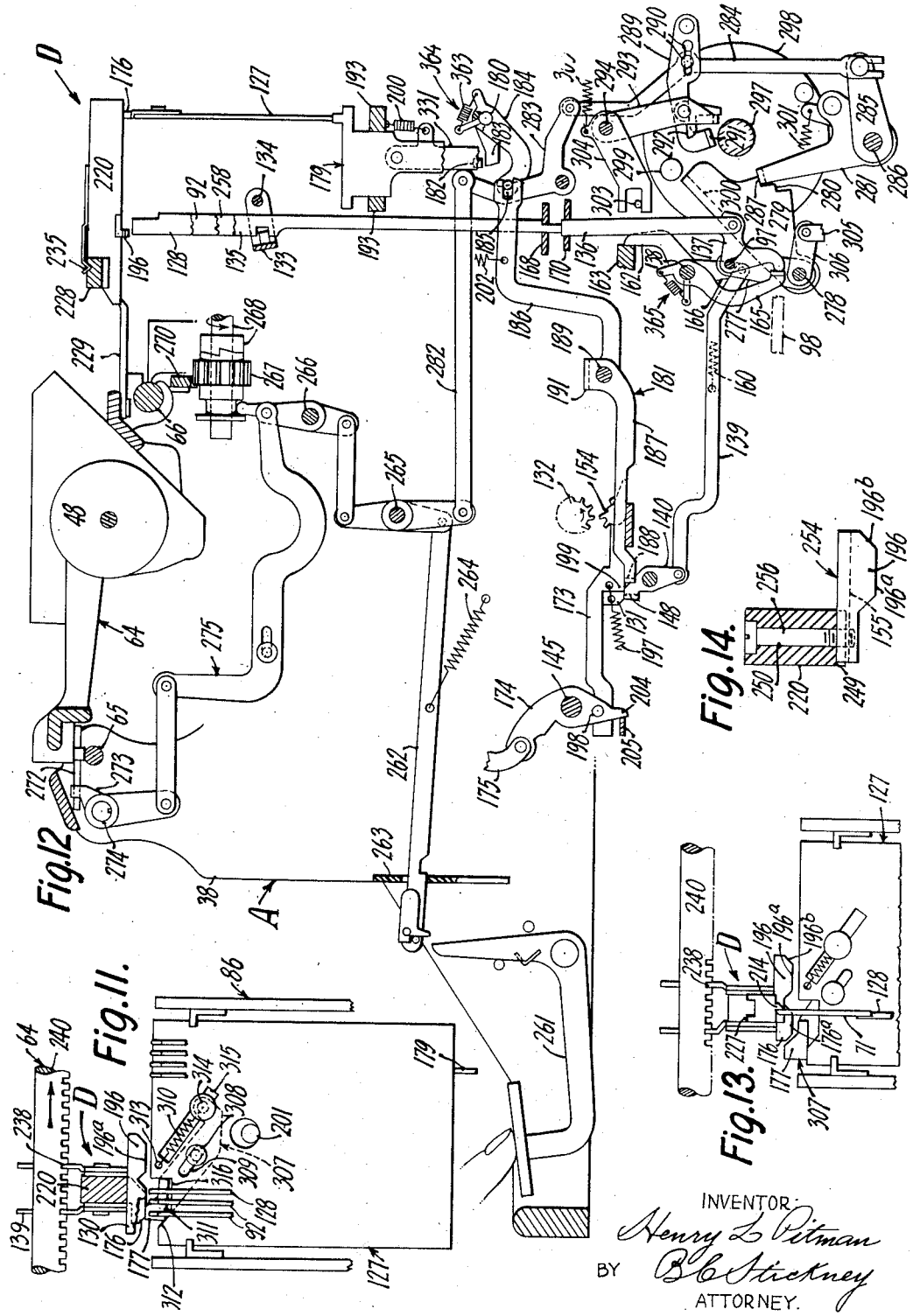

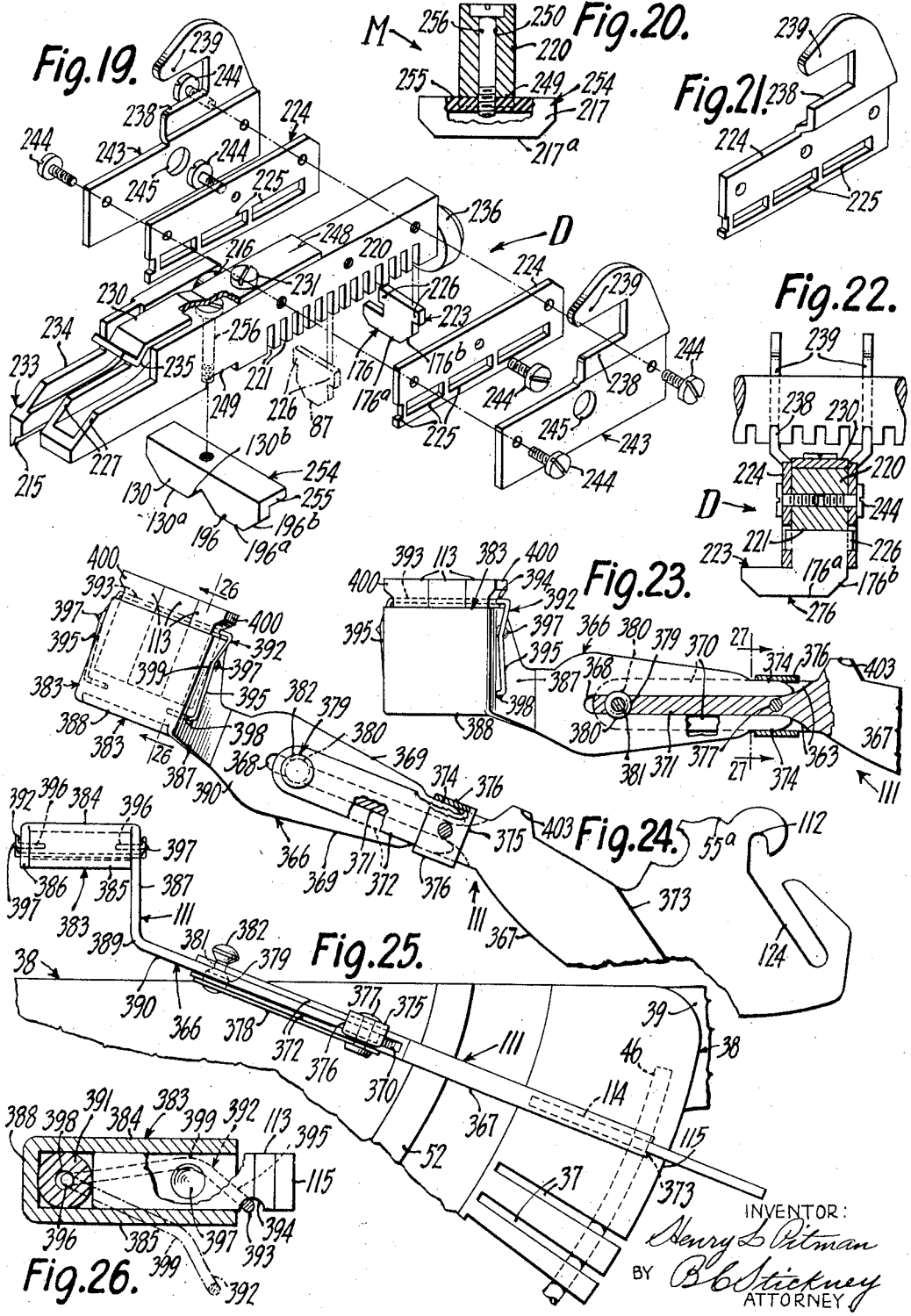
Oct. 1, 1940. H. L. PITMAN 2,216,627
COMBINED TYPEWRITING AND COMPUTING MACHINE
Filed April 9, 1937 9 Sheets-Sheet 8

Oct. 1, 1940.  H. L. PITMAN  2,216,627
COMBINED TYPEWRITING AND COMPUTING MACHINE
Filed April 9, 1937   9 Sheets-Sheet 9
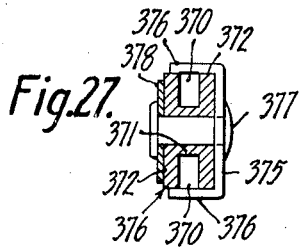
Fig.27.
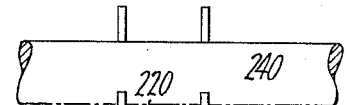
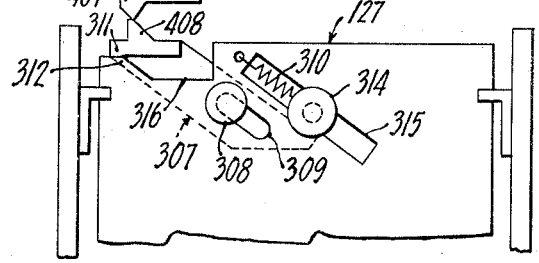
Fig.28.
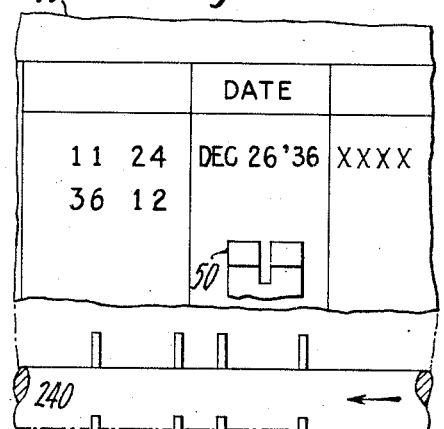
Fig.29.
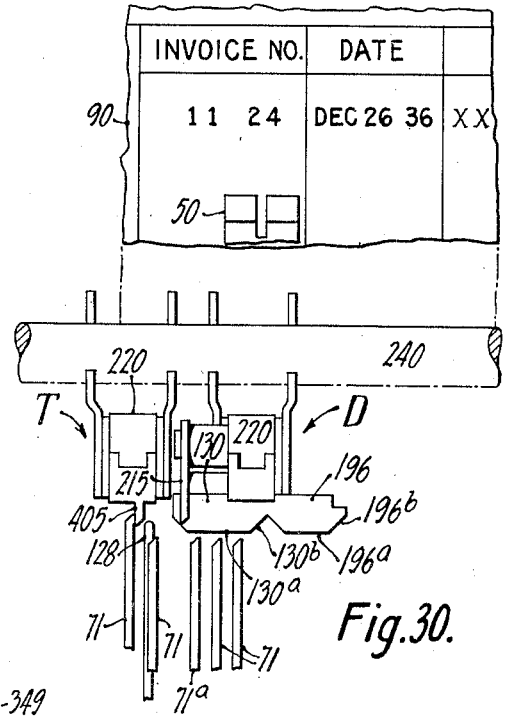
Fig.30.
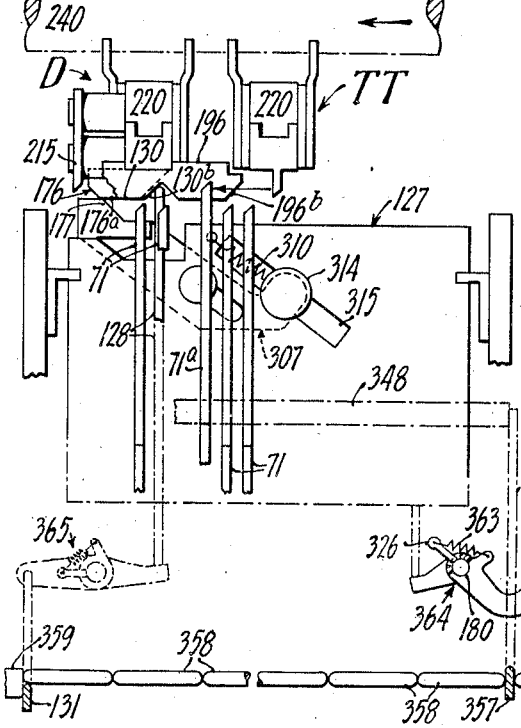
INVENTOR:
Henry L. Pitman
BY
D. C. Stickney
ATTORNEY.

Patented Oct. 1, 1940

2,216,627

UNITED STATES PATENT OFFICE 2,216,627

COMBINED TYPEWRITING AND COMPUTING MACHINE

Henry L. Pitman, Hartford, Conn., assignor to Underwood Elliott Fisher Company, New York, N. Y., a corporation of Delaware Application April 9, 1937, Serial No. 135,892

36 Claims. (Cl. 197—17)

This invention relates to typewriter-accounting machines and to mechanism therein for printing a date or other set data that is to be repeated for individual lines of typing on work-sheets.

The invention aims to provide improved mechanism whereby said date or data is printed automatically by the machine and under control of means such as the typewriter carriage in order to reduce the operator's labor, avoid errors, and gain other advantages.

A further object of the invention is to have each automatic printing of the date include the month, and the day; and the year may also be included.

A further object of the invention is to provide for adjusting said mechanism relatively to the travel of the letter feeding or column tabulating carriage so that any column of the work-sheet may be allocated for the automatic entry of said date or data, consonantly with different forms of work-sheets.

For printing said date or data there may be employed a single type-carrier having types that are changeable. For instance, in a type-bar for printing the date, DEC. 26 '36, a type-insert comprising three separate type-slugs, one for the month, one for the day and one for the year, is used and is changeable for different dates. Such complement or group of date types is preferably condensed laterally to print within a column narrower than if the types were arranged according to the standard letter spacing of the machine. They may be arranged also according to said standard letter spacing. In any case, their aggregate imprint on the work-sheet covers several letter-spaces.

A further object of the invention is to provide means whereby, incidentally to the date-printing operation of said type-carrier, the typewriter carriage is caused to advance automatically according to said several date-covering letter-spaces. For example, if the allocated "Date" column is between two other work-sheet columns separated by a number of letter-spaces sufficient to include the date-imprint and column demarcating spaces, said means will work automatically to cause the carriage to traverse said number of letter-spaces incidentally to the automatic operation of said single type-carrier; and said means include provision for adjustment so as to be operable for any place in the work-sheet line, that is, be operable for any "Date" column that may be allocated within the width of the work-sheet.

The invention also provides improved devices for retaining the type-insert on said single type-carrier and for facilitating the removal or replacement of said type-insert.

The invention is herein shown applied to a typewriter, such as the Underwood, employing key-controlled type-bars, operable one at a time, a platen, and a letter feeding and tabulating carriage. The single date-printing type-bar is disposed at one end of the usual array of type-bars and like the latter is mounted for movement toward a common printing point. A power-operable snatch-roll is incorporated in the typewriter and is used as the power-medium or motor. Means actuable to connect the date type-bar to said snatch-roll for a printing stroke are under control of the typewriter-carriage, the latter being provided with a controller preferably in the form of a tappet to engage and actuate a jack or cam-plate to operate said connecting means, and said controller or tappet may be adjustable along said carriage so as to be effective at such place in the carriage travel as corresponds with the predetermined date-printing column of the work-sheet.

There is also provided means operable to connect carriage advancing mechanism to said snatch-roll for advancing the carriage the aforesaid number of letter-spaces incidentally to the power-operation of the date-printing type-bar; the carriage having a controller or tappet-device for engaging and actuating another jack to operate the last-mentioned connecting means; and said tappet-device is adjustable along the carriage in correlation with the adjustment of the tappet that serves to connect the date type-bar to the snatch-roll. The automatic advance of the carriage is effected preferably by working the letter-feed escapement repeatedly to effect the requisite extent of carriage advance; and since the ink ribbon feed may be operated concomitantly with said escapement there is gained the advantage that the ribbon is fed an extent consonant with the aggregate width of the date-types, thereby conducing to even wear of the ribbon.

The aforesaid controllers that serve on the carriage to connect the date type-bar and escapement to the snatch-roll may be incorporated in a controller or tappet-unit settable along the carriage according to whichever work-sheet column is to be allocated for date printing.

The invention also provides means whereby during the return of the carriage, usually effected by means of power operable mechanism, said tappet-unit does not work to operate the date-printing type or the escapement.

The invention also includes means conditionable at will, whereby said tappet-unit does not work the date printing type or the escapement during the advance of the carriage through a date printing zone, said means being conditionable, for example, preparatory to doing ordinary typing with the type-writer mechanism and being restorable at will.

Means are also provided whereby, at operation of a tabulating mechanism to skip the date-printing zone, said tappet-unit does not work to operate the date-printing type or the escapement. Thus, at operation of the tabulating mechanism to skip the "Date" column, the date-printing devices are silenced so as to be inoperative while the carriage advances through said "Date" column zone to skip the latter.

The date-printing tappet-unit may form part of a set including other units, such set being devised for a given form of work-sheet, and said other units operating during the typing of a line to control computing mechanism that is usually included in machines provided with the date-printing mechanism.

Certain features of the invention pertain to constructing and arranging carriage controlled parts of the date-printing mechanism in structure simplifying correlation with certain carriage controlled parts of the computing mechanism.

The carriage-controlled letter-spacing devices that are operative to automatically space the carriage a predetermined number of letter-spaces may be adapted for use aside from the date or data-printing operations. For example, such devices may be used to automatically advance the carriage from one column to another column that is separated from the first column by a multiplicity of letter-spaces.

The date-imprint on the work-sheet may extend laterally to either side of the conventional common printing point of the regular typewriter types. In such case a primary part of the total number of letter-spaces to be traversed by the carriage incidentally to the date printing may be caused to be traversed after printing the last character in a column preceding the "Date" column and before and preparatory to the operation of the date type-bar so that the date-imprint does not overlap said preceding column. Then, after the date type-bar has been operated, the remaining or secondary part of said number of letter-spaces may be traversed by the carriage to bring the date-imprint clear of said printing point preparatory to operating one of said regular type-bars for an entry in a column succeeding the "Date" column. Primary and secondary control or tappet means on the carriage may operate to cause the latter to work or control the escapement to cause the carriage to automatically traverse each of said parts of said number of letter-spaces. The traverse by the carriage of the primary part of said number of letter-spaces may also be effected by manually operating the tabulating mechanism, and in such case provision of the primary escapement-controlling tappet for the "Date" column may be dispensed with.

Broadly considered, the invention aims to make provision, in a conventional typewriter such as the Underwood, for automatically causing to be printed, at a variably predeterminable place in the typing line, a date that is particularized and therefore covers a plurality of letter-spaces, and to make provision whereby the carriage advances automatically consonantly with said plurality of letter-spaces.

Other features and advantages will hereinafter appear.

In the accompanying drawings,

Figure 2 is a view of a ribbon vibrator adapted to cooperate with the wide date type.

Figure 3 is a partly sectioned perspective of the date-printing devices.

Figure 4 is a side elevation showing the means and manner of operation thereof whereby the carriage connects the escapement rocker to the snatch roll for an ensuing carriage-advancing operation.

Figure 5 is a fragmentary side elevation showing the device and manner of operation thereof for causing repeated connection to the snatch-roll of an actuator or draw-link for the escapement rocker.

Figure 6 is a side elevation of the date type-bar train and the means and manner of operation thereof for actuating said train by means of the snatch-roll and under control of the carriage.

Figure 7 is a front elevation showing the "Date" column tappet-unit and the mechanism cooperative therewith for connecting the escapement rocker and the date type-bar to the snatch-roll; the view also showing some of the other tappet-units included in a set of units devised for a given work sheet form.

Figures 8 and 9 are detailed cross-section views of tappet-units.

Figure 11 is a front elevation showing the device and manner of operation whereby, during the carriage return run, the "Date" column tappet-unit idly overrides the means that connect the date printing type-bar to the snatch-roll.

Figure 12 is a side elevation showing the mechanism and manner of operation thereof for preventing, during a power-driven carriage return run, the "Date" column tappet-unit from working the means that connect the escapement rocker to the snatch-roll.

Figure 13 is a front elevation showing the "Date" column tappet-unit equipped with a tabulating stop and the latter engaging a projected counter-stop for positioning the carriage to directly register said "Date" column tappet-unit with the means that connect the date type-bar to the snatch-roll.

Figure 14 is a front elevation showing individually a form of tappet, used with the Figure 13 unit, for connecting the escapement rocker to the snatch-roll after operation of the date-printing type.

Figure 1:
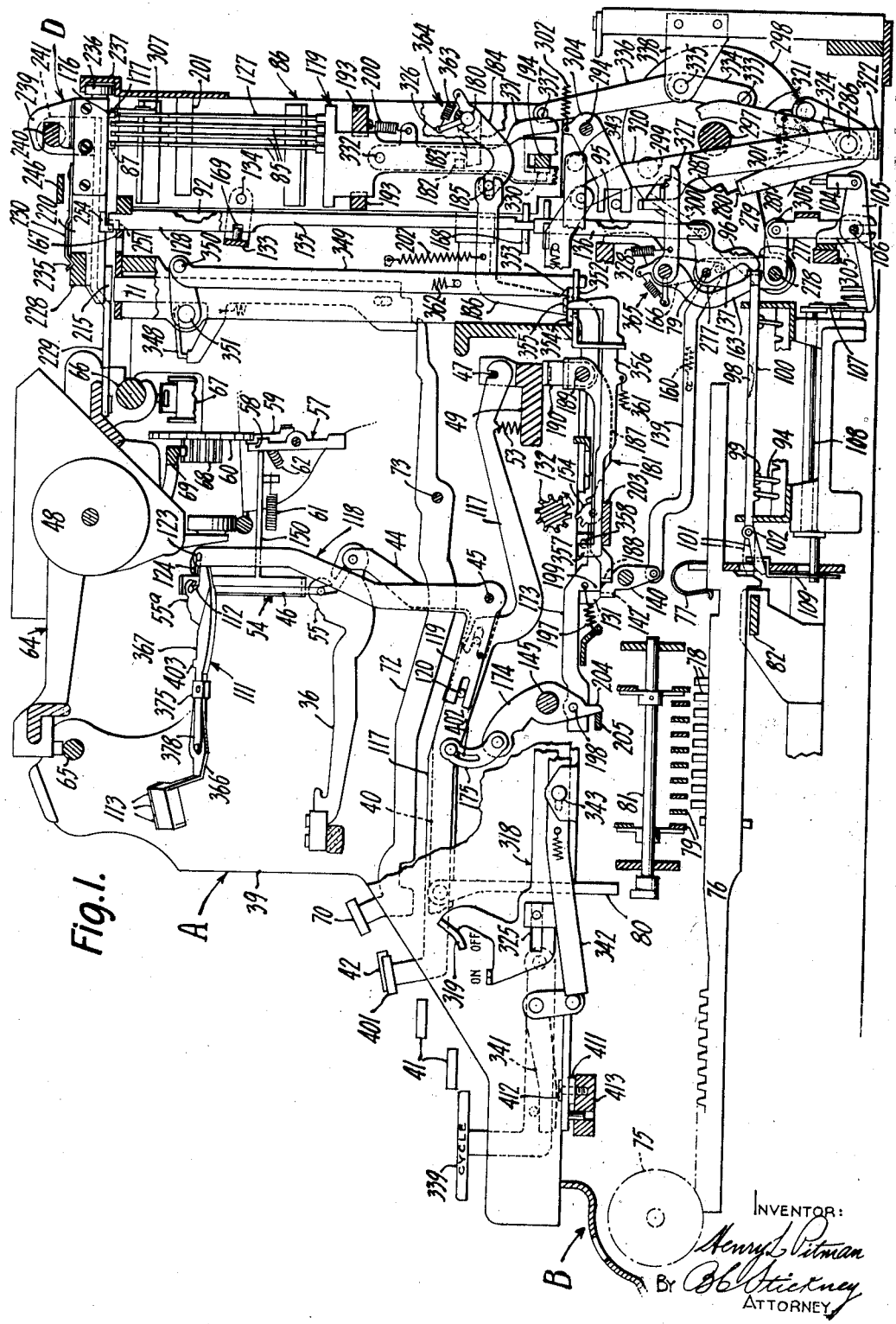
Figure 1 is a cross-sectional side elevation of the machine showing the disposition of the mechanism for automatic date or data printing.

Figures 15 and 16 are side elevations of devices for disabling and restoring the date-printing mechanism at will; Figure 16 showing said devices as conditioned by means of a key to prevent the carriage and its "Date" column tappet-unit from working the date-printing mechanism as when it is desired, for example, to use the regular typing means to type other data than the date in the zone of carriage travel for which said date tappet-unit is set; and Figure 15 shows the operation of means for restoring said devices.

Figure 17 is a front elevation showing the "Date" column tappet-unit equipped with a tabulating stop and engaging a counter-stop for positioning the carriage to register said tappet-unit with the means that connect the escapement rocker to the snatch-roll for a carriage advance preceding the operation of the date type-bar.

Figure 18 is a front elevation showing disposition, for printing the date at the beginning of a line, of the "Date" column tappet-unit for operating the date-printing mechanism as the carriage takes the usual drop-back step or the like at the end of the carriage return movement.

Figure 19 is a perspective of components of the "Date" column tappet-unit separated from one another to illustrate details.

Figure 20 is a partly sectioned front elevation showing a modified form of the tappet that serves to connect the escapement rocket to the snatch-roll.

Figure 21 is a perspective of a tappet-unit component that combines certain parts shown constructed separately in Figure 19.

Figure 22 is a cross-section of the tappet-unit having the modified component of Figure 21, and further showing in detail the tappet that controls the date-printing type-bar.

Figures 23 and 24 are enlarged-scale partly sectioned side views of the date-printing type-bar showing details of the construction for detachably connecting a type-carrying upper member to a lower member of the type-bar, and also showing the means for removably retaining the types in said upper member.

Figure 25 is a front elevation showing the date-printing type-bar as mounted in the type-bar segment and swung to printing position.

Figure 26 is a cross-section, taken on the trace 26—26 of Figure 24, of a type-insert retaining socket or box of the date-printing type-bar, and shows details of the means for removably retaining the type in said socket.

Figure 27 is a cross-section of the date-printing type-bar on the trace 27—27 of Figure 23.

Figure 28 shows, in front elevation, a modified date type-bar-controlling tappet and a modified cam-spur co-operative therewith.

Figure 29 is a front view diagram showing the parts and their operation whereby, while tabulating the carriage through the date zone for skipping the latter, the date-printing devices are ineffective.

Figure 30 is a front view diagram showing the co-operation of tabulating stops for positioning the carriage for a column preceding the "Date" column.

The invention is shown applied to a combined typewriting and computing machine of the Underwood-Hanson class exemplified in my Patent 1,927,951 issued September 26, 1933.

In such machine a typewriter A is superposed on a computing base B.

Type-bars 36, Figure 1, are arrayed arcuately in slots 37 of a segment 38, Figure 25, supported by typewriter frame 39, and typing levers 40, operable selectively under control of alphabet and numeral type-keys 41, 42, are each connected to a companion type-bar 36 by a bell crank 44 fulcrumed at 45, the type-bars 36 having an arcuate fulcrum rod 46 in the segment 38, said levers 40 being fulcrumed at 47 and spaced laterally in a slotted cross-bar 49 of the framework. The type-bars 36 swing to a platen 48 to print at a common printing point represented, Figure 10, by the usual central type guide 50. A stop anvil 52 on the segment 38 co-operates, in known manner, with the type-bar 36, and spring 53 for typing lever 40, Figure 1, co-operates to restore the type action.

A universal bar 54 is moved rearwardly, by type-bar heel 55, at the end portion of the printing stroke to work an escapement rocker 57 and escapement dogs 58, 59 thereon relatively to an escapement wheel 60. Springs 61, 62 restore said universal bar 54 and escapement rocker 57 at the type-bar recoil. A carriage 64 mounts the platen 48 and runs along guide-rails 65, 66 on the frame 39. The usual spring motor 67 urges said carriage in letter-feed steps controlled by said escapement dogs 58, 59 and escapement wheel 60, the latter having a pinion 68 engaging a rack 69 on said carriage.

Depression of a tabulating key 70, mounted on a tabulating key-lever 72 fulcrumed at 73, releases the carriage 64 for an advance which is checked when a counter-stop 71, at the back of the typewriter, projected upwardly by said key-lever 72 intercepts a column stop, hereinafter described, on the carriage 64. Connections, not shown, enabling said tabulating key 70 to release the carriage 64, may be of the kind seen in Patent 1,858,447 to W. F. Helmond issued May 17, 1932.

The computing base B may have a plurality of laterally spaced registers or sets of computing wheels 75, Figure 1, each register having its own set of reciprocatory indexable denominational wheel driving register-bars 76. Such plurality of registers and the lateral spacing thereof is exemplified in my aforesaid Patent 1,927,951. For indexing, each register-bar 76 is slightly advanceable individually, counter to the usual restoring spring 77, to bring digit pins 78 thereon from the Figure 1 positions to positions under transverse digital pin-setting bars 79. By means of rod 80 pendent therefrom each numeral key controlled lever 40 when depressed rocks a companion shaft 81 to depress the companion pin-setting bar 79 and thereby, in whichever register-bar or bars 76 have been slightly advanced, depress the corresponding digit pin or pins 78 into the path of a reciprocatory general operator cross-bar 82. Said cross-bar 82 is cycled after the digit pin-setting or indexing operations have been effected for a selected set or sets of register-bars 76, thereby cycling the latter to drive their computing wheels 75, and actuate carry-over devices not shown. Means, not shown, are operative to restore the set digit pins 78 near the end of the cycle.

The registers are selected by selecting the sets of register-bars to be indexed and for this and for slightly advancing the register-bars of each selected set seriatim in denominational order and under control of the carriage to bring their respective rows of digit pins 78 under the pin-setting bars 79 there may be employed mechanism disclosed in my copending applications Serial No. 472,610 filed August 2, 1930, Serial No. 604,691 filed April 12, 1932 and Serial No. 72,348 filed April 2, 1936, and such mechanism is therefore briefly described as follows: For each register of the machine there is an individual cam-plate 85, Figure 1, the several cam-plates being slidably supported for individual edgewise vertical movement, in a housing 86 on the machine framework. Said cam-plates 85 form a group traversible by cam-plate selecting teeth 87 on the carriage. For each computing column of a work sheet, such as 90, Figure 10, for example, there is provided on the carriage 64 a column unit C, Figures 3, 7 and 10, having one or more of said teeth 87 to engage and depress the appropriate one or more cam-plates 85 when the carriage arrives at the zone for said computing column. Each computing-column unit C also includes a denomination selecting tooth 91 which at the travel of the carriage through the computing zone depresses denominational jacks 92, Figures 1 and 3, seriatim for slightly advancing the register-bars 76 in denominational order to bring their digit pins 78 under the pin-setting bars 79. One group of series of jacks 92 serves for all the register-bar sets and therefore ramifies to the latter by means of denominational cross-blades 94, Figure 1, rockable individually upon their lower edges. Said jacks depress denominational rods 95, Figure 1, so that the latter, by means of bell cranks 96 fulcrumed on a rod 97 move denominational master racks 98 forwardly to rock said cross blades 94, each rack 98 meshing individually as at 99 with the companion cross-blade 94. Behind each set of register-bars 76 is a set of denominational sub-racks 100 each having a coupler 101 pivoted thereto at 102 and normally depressed, in the full line position, Figure 1, so that the sub-rack 100 and its register-bar 76 are normally operatively disconnected. Selection of a set of register-bars is effected by raising its set of couplers 101 to the Figure 1 dotted-line position by depressing the appropriate cam-plate 85. Intermediate connections, Figure 1, between each cam-plate 85 and its set of couplers 101 include a partly shown thrust-rod 104 operatively connected to said cam-plate 85, a lever 105 pivoted at 106 and cooperating with linkage 107 to link said thrust-rod 104 to a rock-shaft 108, and a transverse coupler-shifting plate 109 slidably supported by the frame-work for up and down movements by said rock-shaft 108. The appropriate cam-plate 85 is kept depressed by its tooth 87 throughout the traverse of the computing zone by the carriage, and the corresponding set of couplers 101 is correspondingly kept elevated. When the tooth 87 leaves said cam-plate 85 at the end of the zone the cam-plate 85, its set of couplers 101 and said intermediate connections become restored by suitable springs not shown.

While the cam-plate 85 is kept depressed as the carriage traverses the computing zone and its set of couplers 101 kept elevated the corresponding set of register-bars 76 is kept connected to the cross-blades 94 ramifying from the denominational jacks 92 so that the traverse of the latter by the tooth 91 slightly advances said register-bars seriatim for indexing.

The novel mechanism for automatically printing a date or other set data in a line of typing will now be described.

A type-bar 111, Figures 1, 3, 6 and 24, for such date or data is preferably mounted at one end of the array of type-bars 36 and has a fulcrum notch 112, Figure 24, for articulation with the fulcrum rod 46 in the type-bar segment 38. Said type-bar 111 may have a plurality or group of type slugs or blocks 113 for printing, at one stroke or simultaneously, the month, day, and year of the date DEC 26 '36, Figure 10, for example. A slot 114, in the segment 38, for said type-bar 111 is spaced sufficiently, as indicated at 115, Figure 26, from the slot 37 for the last type-bar 36 so that the type of the latter and the wide group of date-type 113 do not clash. It will be understood that each slug has the appropriate type on its printing face. Thus, for said date the left hand type or slug 113, Figure 24, has types for the month, DEC, the middle slug 113 has types for the day, 26, and the right hand slug 113 has types for the year, '36.

A date-typing lever 117, fulcrumed at 47, and having a restoring spring 53, Figure 1, is connected to said date type-bar 111 by a bell crank 118, Figures 1, 3 and 6, fulcrumed at 45. A forwardly reaching arm 119 of said bell crank 118 has a pin-and-slot connection 120 to said lever 117. Said bell crank 118 also has an upwardly extending arm 121 having a lateral reach 122, Figure 3, provided with a pin 123 for engaging a cam-slot 124 in said type-bar 111. A heel 55ᵃ of said date type-bar 111 engages the universal bar 54 as in Figure 6 to effect a letter-space step of the platen carriage 64 in the same way as does the heel 55 of any of the type-bar 36. Said universal bar 54 also has connection, diagrammatically represented at 125, Figure 4, to a vibrator 126 for an ink-ribbon 129 and said connection may be of the kind seen in Patent 926,050 to F. A. Cook, issued June 22, 1909. Prongs 126ᵃ of said ribbon vibrator may be spaced sufficiently apart, Figure 2, to permit the wide date-printing type 113 to strike therebetween.

Figure 10:
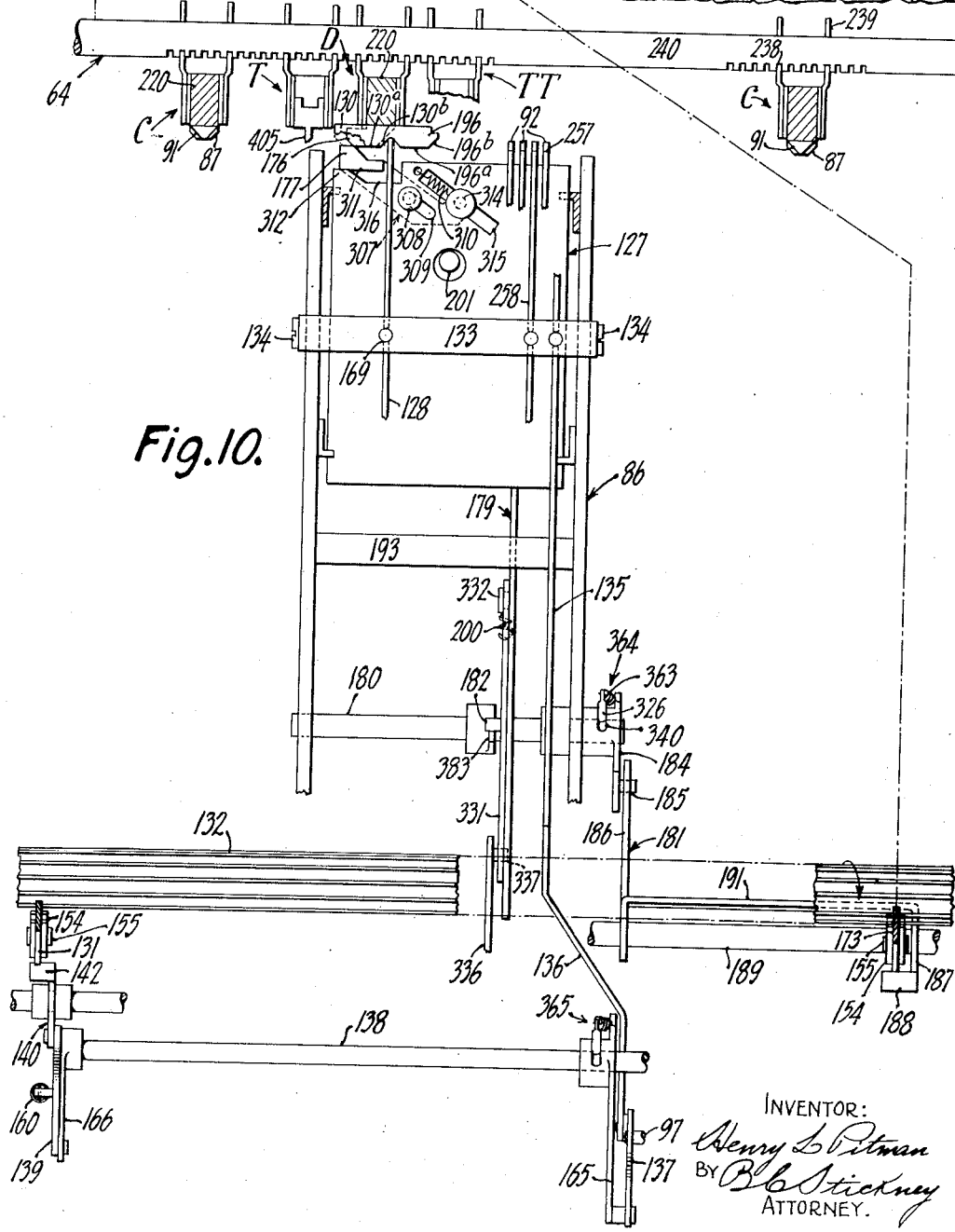
Figure 10 is a front elevation, similar to Figure 7, showing the "Date" column tappet unit as having engaged and actuated the means whereby the date type-bar is connected to the snatch-roll, an illustrative work sheet form being shown relatively to said date unit and other column tappet-units.

The plural date-types 113 are disposed preferably so that the center of their aggregate imprint substantially coincides, Figure 10, with the common printing point at the center type-guide 50. The date-imprint thus extends to the left of said common printing point. It is necessary therefore, following the usual single letter-space carriage-step that occurs with the typing of the last figure, in say, the "Invoice" column of the work-sheet 90, Figure 10, to advance the carriage farther before printing the date so that the date-imprint will clear the "Invoice" column. Since the date-imprint also extends to the right of the common printing point, it is also necessary following operation of the date-type-bar 111 to advance the carriage sufficiently to bring the date-imprint on the work sheet clear of the common printing point preparatory to typing the first character, in say, the "Description" column of the work-sheet 90.

Operation of the date-type-bar 111 and advancement of the carriage 64 an extent consonant with the date-imprint width are effected automatically under the control of said carriage. Therefore, a date-column-unit D is located on the carriage so that at the carriage travel relative to the "Date" column for the work-sheet 90, said date-column-unit D may engage a date-type-bar-controlling jack or cam-plate 127 and a carriage-advance or escapement controlling jack 128. Said cam-plate 127 is grouped with the register-selecting cam-plates 85, as in Figure 1; and said escapement controlling jack 128 is grouped with the denominational-register-bar-controlling jacks 92, and is placed preferably between the two jacks 92 for the tens of cents and units of dollars denominations.

As the carriage takes the usual letter-space step at the typing of the last figure in the "Invoice" column of the work-sheet 90, a tappet 130 on the date-column-unit D encounters and depresses the escapement-controlling jack 128 as in Figure 7, to thereby, by means of an intermediary train, lift a draw-link 131, operatively connected to the escapement rocker 57, into engagement with a power-operable snatch-roll 132 supported and journaled in the framework. Said intermediary train includes, Figure 3, a cross bail 133 pivoted as at 134 to the housing 86 and connecting said jack 128 to a dummy jack 135, a thrust-rod 136, a bell-crank 137, a rock-shaft 138, a link 139 and a train-terminating bell crank lever 140 having a lateral tab 142 for engaging and lifting the escapement-rocker actuating draw-link 131 into engagement with said snatch-roll 132. Rearward movement imparted to the lifted draw-link 131, by the rotating snatch-roll 132 rocks a lever 143, connected to said draw-link 131 at 144, about a fulcrum-rod 145, supported by the framework and said lever 143 working against a cam-arm 147 on a rock-shaft 146 rocks the latter to work the Underwood universal bar structure, the latter including a rockable frame 148 pivotally connected at 149 to a plate 150 extending rearward from the universal bar 54; said frame 148, also having an arm 152 for working the ink-ribbon feed as will be explained later. By means of an arm 153 engaging said arm 152, the rock-shaft 146, when rotated counter-clockwise of Figures 3 and 4, by means of the snatch-roll 132 and described connections, rocks said frame 148 clockwise, and thereby moves the universal bar plate 150 rearwardly to rock the escapement-rocker 57 clockwise, said plate 150 engaging said escapement-rocker 57 as at 153ª, Figure 3.

It may be noted that as the draw-link 131 is lifted, a toothed element 154 thereof meshes with the snatch-roll 132, as in Figure 4, and thereupon is at first turned idly by the latter, about a pivot 155, to a stop position relative to the draw-link 131, like in Figure 6, which represents a similar element 154 for another draw-link that will be described later. The snatch-roll 132, having thus first turned said element 154, then moves the draw-link 131 rearwardly, and then a cam-end of the latter, like 156 for said other draw-link in Figure 6, encounters a fixed cam-edge 157, and said draw-link 131 is thereby caused to become disconnected from the rotating snatch-roll 132, to limit the clockwise rocking of the escapement-rocker 57 to a position like in Figure 6. As the draw-link 131 becomes thus disconnected from the snatch-roll 132 it is urged forwardly by a spring 158 to permit the universal bar plate 150 to move forwardly and the escapement-rocker 57 to rock counterclockwise by means of their respective springs 61, 62. At the described reciprocatory rocking of the escapement-rocker 57, effected automatically under control of the carriage and by means of the snatch-roll 132, the escapement wheel 60 and carriage spring 67 cooperate to advance the carriage a letter-space step beyond the step that occurred with the printing of the last figure of the "Invoice" column of the work-sheet 90.

The carriage-advance-controlling tappet 130 of the unit D has a dwell 130ª which keeps the jack 128 depressed, and thereby keeps the draw-link-lifting tab 142 elevated as in Figure 5, at the end of said further carriage-step. It results that a cam-edge 159 of the released and forwardly-spring-pressed draw-link 131 encounters said still lifted tab 142, and that said draw-link 131 is thereby deflected upwardly again to re-engage the snatch-roll 132, like in Figure 4, for repeating the described reciprocation of the escapement-rocker 57 for effecting still another letter-feed step of the carriage 64. Said dwell 130ª of the carriage-advance-controlling tappet 130 is of such extent as to automatically effect enough letter-feed-step repetitions to bring the "Date" column of the work-sheet 90 into appropriate register with the imprint-field of the date type-bar 111; the letter-step repetitions ending with the step wherein a dwell-terminating edge 130ᵇ of said tappet 130 permits the depressed jack 128 to rise again, and the lifted draw-link-controlling tab 142 to drop again, as a spring 160, acting on the link 139 of the intermediary train that connects said jack 128 and the tab-bearing bell-crank lever 140, restores said train and jack 128 to normal positions determined by abutment of a stop-arm 162, on the rock-shaft 138, with a cross-bar 163 of the framework. Said rock-shaft 138 is journaled in brackets 164 on said cross-bar, Figure 7, and has an arm 165, engaged by the bell-crank 137 of said train, and an arm 166 to which the link 139 is connected. The jacks 128 and 135 are articulated to their connecting cross-bail 133 by pin-and-slot connections 169, Figure 4, and are guided, like the denominational jacks 92, for endwise vertical movements in slotted cross-members 167, 168, Figures 1 and 3, in the housing 86. A slotted cross-member 170 of the framework guides the thrust rod 136 of the escapement controlling train and the thrust rods 95 of the denominational indexing trains near their upper ends, said upper ends being abutted by the lower ends of their respective jacks 92, 135. The fulcrum rod 97 for the denominational bell-cranks 96 also fulcrums the bell-crank 137 of said escapement controlling train.

A draw-link 173 may be moved rearwardly by the snatch-roll 132 and thereby rock a lever 174 counterclockwise, Figures 3 and 6; on the fulcrum rod 145 to depress the date type lever 117, connected to said lever 174 by a link 175.

In the carriage step at which the tappet edge 130ᵇ releases the jack 128 a date type bar controlling tappet 176, Figures 1, 3, 7, 8, 10, 19, 22, provided on the "Date" column unit D, comes into play and depresses the cam-plate 127 by engaging a cam spur 177 on the latter as in Figure 10.

Said cam-plate 127 when thus depressed lifts the date-type-bar draw-link 173 into engagement with the rotating snatch-roll 132, by depressing a sub-plate 179 to rock a shaft 180 to rock a lever 181; said sub-plate 179 having a stud 182 engaging an arm 183 of said rock-shaft 180, the latter being journaled in the housing 86, Figures 1, 3, 7, 10, and having an arm 184 connected, as at 185, to an arm 186 of said lever 181. Said lever 181 also has an arm 187 provided with a draw-link-lifting lateral tab 188 and is fulcrumed on a rod 189 supported by brackets 190, Figure 1, on the cross-bar 49. Said lever-arms 184 and 187 are shown relatively offset laterally, Figure 3, and connected by a yoke 191. Collars 192 retain the lever 181 laterally on the fulcrum rod 189. Upper and lower cross-bars 193, 194 guide the sub-plate 179 vertically in the housing 86.

The date-type-bar draw link 173, engaged with the rotating snatch-roll 132 through depression of the cam-plate 127 by the tappet 176, as in Figure 10, is drawn rearwardly and thereby depresses the date-type-lever 117 to rock the companion bell-crank 118 and swing the date-type-bar 111 to the platen for printing the date in the "Date" column of the work-sheet 90. The fixed cam-edge 157 engages the cam-end 156 of the rearwardly moving draw-link 173 to disconnect the latter from the snatch-roll 132 to permit the date-type-bar 111, after its date-type 113 strike, to recoil from the platen.

The escapement rocker 57 and the universal bar structure 54, 148, 150, are reciprocated by means of the date-type-bar heel 55ª and the springs 61, 62, and thus co-operate with the escapement wheel 60 and carriage-spring 67 to advance the carriage a single letter-space step incidentally to the date-printing operation of the type-bar 111. By this latter letter-space step, a secondary escapement controlling tappet 196 on the date-column unit D on the carriage comes into play and depresses the jack 128 again to connect the escapement-rocker actuating drawlink 131 to the snatch-roll 132 for a further letter-space step of the carriage. Said tappet 196 has a dwell 196$^a$ to keep the jack 128 depressed for further letter-space-step repetitions to bring the first plate in the "Description" column of the work-sheet 90 to the printing point; it being noted that said dwell 196$^a$ effects said letter-space-step repetitions in the same manner as did the dwell 130$^a$ on tappet 130 preparatory to the date-type-bar operation. A dwell terminating edge 196$^b$ permits the jack 128 to rise at the step which brings the first place in the "Description" column to the printing point and thereby halts the carriage at said place.

The date type-bar-controlling tappet 176 need not release the cam-plate 127 in the letter step following operation of the date type-bar 111 and is therefore shown provided with dwell 176$^a$, Figure 8, to keep the cam-plate 127 depressed and the date draw-link-lifting tappet 188 elevated, Figure 6, while the carriage is being advanced from the date-printing place to said first place in the "Description" column. Said lifted tab 188 thus opposes full-return of the date-type draw-link 173 at release of the latter from the snatch-roll 132, it being noted that at said release a forwardly and downwardly pulling restoring spring 197 swings said draw-link 173 downwardly, about its pivotal connection 198 to the lever 174, to clear the snatch-roll 132. Thus said elevated tab 188 blocks an edge 199, Figure 6, of said downwardly swung draw-link 173 to oppose, for the time being, full return of the latter. It should be noted that the draw-link 173 when released from the snatch-roll has enough forward movement, before its arrest by the elevated tappet 188 to permit the date-type-bar heel 55$^a$ to recede from the universal bar 54 to permit the latter and the escapement rocker 57 to effect completion of the letter-space step that is to occur with the date-type-bar operation. A modification of the tappet 176 designed to permit immediate release of the cam-plate 127 to occur in the letter-space step following the date typebar operation will be described later.

As or before the carriage takes the final step which brings it to the first character place in the "Description" column, a dwell-terminating edge 176$^a$ of the tappet 176 permits the cam-plate 127 urged by a spring 200 on the sub-plate 179 to rise with the latter to normal positions determined by a cam-plate engaging stop 201, Figures 1, 10, 11. This permits the lever 181, urged by a spring 202, and the rock-shaft 180, to return to normal positions wherein arm 187 of said lever 181 abuts a stop-bar 203. Said stop-bar 203 also limits the downward swing of the draw-links 131, 173 by their springs 158, 197. At the return of the lever 181 to its normal position, its tab 188 releases the date-type draw-link 173 and the latter, urged by its spring 197, returns to normal position, Figure 3, determined by abutment of a spur 204 on the lever 174 with a stop 205 on the frame. Similarly, Figure 3, a stop 206 is engaged by the lever 143, connected to the escapement draw-link 131, to determine the normal position of the latter.

When the universal-bar structure 54, 148 is operated repeatedly incidentally to operation of the date-type-bar 111 as above described, it also operates to feed the ribbon 129, Figure 4, repeatedly to an aggregate extent commensurate with the wide date-imprint. The ribbon-feed mechanism may be of the kind seen in Patent 931,303 to Helmond, dated August 17, 1909, and is accordingly diagrammatically represented at Figure 4 by a pawl-device 208 connected as at 209 to the arm 152 of the universal-bar-structure frame 148, a ratchet 210 operable by said pawl-device 208, and ribbon-spools 211 operatively connected to said ratchet as indicated by the dotted line 212.

It will be evident from the foregoing that consequent to typing the last character in the "Invoice" column there will automatically occur, under control of the date-column-unit D, a date-printing operation of the date-type-bar 111, and plural letter-space advance of the carriage, before and after the date-type-bar operation, to register the date-imprint with the "Date" column and finally advance the carriage to the first character place in the "Description" column.

The carriage may also be tabulated to bring the date-column-unit D into play as, for example, when it is desired to skip the "Invoice" column. One of the denominational-tabulating stops 71, for example, the stop 71 for the tens of cents denomination, is projected by means of its key 70 and arrests the resulting carriage advance by engaging a column stop 214 disposed on the date-column unit D, as in Figure 13, so that upon retraction of said stop 71 the carriage settles in the position wherein the date-type-bar-controlling tappet 176 of said unit D just depresses the date-type-bar-controlling cam-plate 127 as in Figure 10. It results as the carriage thus settles in said position that operation of the date-type-bar 111 follows immediately, instead of following the hereinbefore described carriage-stepping operation effected under control of the tappet 130, and said tappet 130 may therefore be omitted from the unit D in that the latter has only the secondary carriage-spacing tappet 196 as represented in Figures 13 and 14. In the letter-space step of the carriage occurring at said immediate date type bar operation said tappet 196 for spacing the carriage farther as hereinbefore described comes into play.

It is feasible to retain provision of the tappet 130 on the date-column unit D and tabulate the carriage so that it settles in the position, Figure 7, wherein said tappet 130 has just depressed the carriage-escapement-operating jack 128. For such purpose a tabulating column-stop 215, for engaging the tens of cents denomination stop 71 is provided on the unit D but is offset laterally from the body of said unit D by spacers 216, Figures 17 and 19. Figure 17 shows the position of the work-sheet "Date" column relative to a line 213, representing the common printing point, when said column-stop 215 abuts said denominational stop 71; it being understood that upon release of the latter, the carriage and its tappet 130 advances slightly to the Figure 7 position to depress the carriage-spacing jack 128.

One or more computing-column units C, the date-column unit D and possibly certain other units T and TT used for tabulating only as hereinafter described, constitute a set for a given work-sheet form, such units being placeable differentially along the carriage for different forms and different locations of date-columns.

Figure 20 represents a unit M usable aside from the date-printing operations in that it is adapted to control only the described carriage-spacing mechanism when it is desired to use the latter for automatically effecting only column or letter-space skipping, said unit M having a tappet 217 provided with a dwell 217ᵃ to keep the escapement-operation-controlling jack 128 depressed for a predetermined number of column-skipping letter-space steps.

The units C and D may each have the same kind of body, namely, an elongate block or rod 220, Figure 19, having a number of notches 221 according to the cam-plate capacity of the machine. In the computing-column unit C one or more of the register-selecting teeth 87 are inserted in the appropriate notches 221; and in the date-column unit D a plate 223 forming the date-type-bar-controlling tappet 176 is inserted in its appropriate notch 221 for co-acting with the cam-plate 127. Plates 224, removably attached, as will presently be explained, to the lateral sides of the body block 220, have key-slots 225 to interlock with lateral key-tongues 226 provided on the teeth 87 and the plate 223 to retain these on the block. Each block 220 is formed with teeth 227, Figure 19, to interlock with a front unit-supporting rack 228, Figures 1 and 3, supported on brackets 229 extending rearwardly from the carriage and a spring-clip 230 attached as by a screw 231 to the block 220, has a detent 235 seatable in a longitudinal groove 232 on said front rack 228 to removably hold the unit against endwise displacement. A plate 233 forming the tabulating-column-stop 215 also forms a tooth 234 to interlock with said front rack 228 for lateral support of said stop 215, said plate 233 being attached to the block 220, and spaced laterally therefrom by the spacers 216. A roll 236 at the rear end of each unit engages a fixed track 237, Figure 1, on the housing 86, to steady the unit vertically when it depresses a cam-plate or jack, said track being limited in length so as to engage the unit substantially only while the latter is active. Each unit also has laterally spaced teeth 238 and laterally spaced clips 239 above said teeth 238 to interlock with and embrace a rear unit-supporting rack 240 supported in upturned ears 241 of the carriage-supported brackets 229. Said rear rack 240 co-operates with said teeth 238 and clips 239 to support the unit and its tappets against turning or becoming cocked about any longitudinal axis thereof and said teeth 238 and rear rack 240 co-operate with the front rack 228 to locate and laterally support the unit C or D. Each tooth 238 and its companion clip 239 may be formed on an individual plate 243 and screws 244 attach said plate 243 and adjacent tappet-retaining key-plate 224 to the block 220. One of said screws 244 may hold the key-plate 224 independently of the outer plate 243 as represented by screw-head clearance 245 in the latter, Figure 19.

Each tooth 238 and companion clip 239 may also be formed integrally with the key-plate 224, as represented in Figures 21, 22. A unit-setting scale 246 is supported by the brackets 229 to register with an index-mark 248 on each unit C or D.

In the computing-column unit C, the denomination-selecting tooth 91, for engaging the denominational jacks 92, has a fixed location lengthwise of the block 220, the latter having a transverse recess 249, Figure 19, and a hole 250, Figure 7, to receive respectively a base 251 and a shank 252 of an element 253, shown separately in dot-and-dash, Figure 7, forming said denomination-selecting tooth 91, said shank 252 having a force fit in said hole 250.

In the date-column unit D said transverse recess 249 is occupied by an element 254, Figure 19, instead of by said element 253, said element being of angular cross-section forming a base 255 and depending therefrom a portion forming the tappets 130, 196, as in Figure 19, or tappet 196 alone, as in Figure 14. The tappet 217 represented in Figure 20 is similarly constructed. A retaining screw 256 is countersunk in the hole 250 of the block 220 and threaded in to the base 255 on said tappet element 254.

For enabling the escapement-controlling tappets such as 130, 196 to clear the denominational jacks 92 and operate only the escapement-controlling jack 128, the tops of said denominational jacks 92 may be jogged as at 257, to remove the portion that is in the path of said tappets 130, 196, while, in said jack 128, said portion is not removed, as shown in Figure 3. Jacks 258, Figure 3, are engageable only by the denominational tooth 91 of a computing unit C for effecting punctuation-spacing of the carriage, but are, like the jack 128, connected to the bail 133 for working the dummy jack 135 that leads to the escapement-actuator draw-link 131; said punctuation jacks 258 also being jogged as at 257. In a computing zone, the denomination-selecting tooth 91 also works the jack 128 for punctuation-spacing, it being remembered that said jack 128 is between the two jacks 92 for the units-of-dollars and tens-of-cents denominations. In other words, in a computing zone, said jack 128 only co-operates with the denomination-selecting tooth 91 for punctuation-spacing, while, in a date-printing zone, said jack 128 co-operates only with the tappets 130, 196, to space the carriage repeatedly incidentally to operation of the date type-bar 111.

After the carriage has been advanced to bring the wide date imprint on the work-sheet clear of the single-type printing point, as, for example, by advancing the carriage as above described, to bring the first letter-space of the "Description" column to said printing-point, the typing of the remainder of the line proceeds. The carriage is then returned preferably by power, preparatory to typing a new line on the same work-sheet or on another work-sheet.

A carriage-return key 261, operated as in Figure 12, releases a latch-link 262 from a holding plate 263 for rearward movement by spring 264 to the Figure 12 position. This rocks a shaft 265 that, in turn, rocks a shaft 266 to shift a carriage-return pinion 267 rearwardly along a power-shaft 268 to clutch said pinion to said power-shaft 268 for ensuing return of the carriage, said pinion 267 meshing with a carriage-return rack 270, and said shaft 268 being driven by a motor, not shown.

As the carriage nears the end of its return run, a dog 272 thereon engages a cam-arm 273, Figures 12, 18, splined to a rock-shaft 274 for adjustment along the latter together with a margin-stop 269, hereinafter referred to. Said dog 272 thus rocks said shaft and thereby, through a linkage 275, moves the carriage-return pinion 267 forwardly again to unclutch it from the power-shaft 268, so as to cause the carriage to bank against said margin-stop, the carriage then taking the usual drop-back step of about one letter-space. This kind of carriage-return mechanism is more fully described in Pitman Patent No. 1,679,741, dated August 7, 1928, to which reference may be had for other details, including a line-spacing device that is operated automatically at the carriage-return operation.

For preventing re-operation of the escapement while the date-column unit D passes the date-zone during the return of the carriage, there may be used, in conjunction with the present improvements, mechanism disclosed in my aforesaid application Serial No. 72,348. Said mechanism disables the denominational jacks 92, the carriage-spacing jack 128, and the punctuation-jacks 258, at engagement of the carriage-return mechanism.

Regarding said jack-disabling mechanism, Figures 1, 12 and 15, the fulcrum rod 97 for the jack-train bell-cranks 96, 137, is supported by upright arms 277 of a rock-shaft 278 journaled in the framework. A step 280 on a latch-plate 279 on said rock-shaft is normally engaged by a latch-arm 281 to hold said rock-shaft 278 so that the fulcrum rod 97 and its bell-cranks 96, 137, said bell-cranks reacting respectively against the master denominational racks 98 and the arm 165, support the jacks 92, 128, 135, 258 for effective co-action with the denomination-selecting tooth 91, and tappets 130, 168.

When the carriage return mechanism becomes set in operative condition, Figure 12, a link 282, from the rock-shaft 265 of said mechanism, a bell-crank 283 pivoted on the framework, a link 284, and an arm 285 of a rock-shaft 286 that mounts said latch-arm 281 co-operate to turn the latter clockwise to the Figure 12 position to release the latch-plate 279. With the latch-plate 279 thus released, the fulcrum-rod 97 is free to move rightward to the Figure 12 position determined by a step 287 of said latch-plate 279 abutting said turned latch-arm 281, Figure 12. In said Figure 12 position of the fulcrum-rod 97, jacks 92 are free to drop idly and are in this manner disabled relatively to the denominational master racks 98; and the carriage-spacing jack 128, punctuation-jacks 258, and dummy jack 135, at the same time, similarly are disabled relatively to the carriage-spacing draw-link 131.

At restoration of the carriage-return-engaging train 262, 265, 267, by means of the carriage-dog 272, at the end of the carriage-return run, the upward movement of the link 284, connected to said train, rocks a lever 289, pivoted to the framework, counterclockwise, Figure 12, by means of a pin and slot connection 290. Thereby a lateral spur 291 of said lever 289 overrides a pawl 292 of an arm 293 on a rock-shaft 294, and rocks the latter so that a catch 295, thereon, Figure 15, releases a clutch-trip-plate 296 to trip a clutch mechanism, not shown, to connect a shaft 297, journaled in the framework, to the motor, not shown, for effecting one complete revolution or cycle of said shaft 297. Said clutch mechanism may be of the kind shown in Patent 1,299,646 to Wood, dated April 8, 1919. In said cycle a cam roll 299, mounted on a plate 298 of said shaft 297, works against a flange 300 of the latch-plate 279 to turn the latter and its rock-shaft 278 counterclockwise, from the Figure 12 position to the Figure 1 normal position, so that the latch-arm 281 urged by spring 301, re-engages the latch-plate step 280. Said pawl 292 permits the lever 289 to turn counterclockwise to the Figure 12 position, at engagement of the carriage-return mechanism, without rocking the cycle-tripping rock-shaft 294, but at the described disengagement of the carriage-return mechanism said pawl 292 and lever 289 co-operate to rock said cycle-tripping shaft 294 for an ensuing cycle of the shaft 297.

A spring 302, Figure 12, yieldably holds the cycle-tripping rock-shaft 294, its pawl-carrying trip-arm 293, and its catch 295 in normal position determined by a stop 303 on the framework engaging an arm 304 of said rock-shaft 294; said spring 302 tending to return the parts to said normal position immediately after the catch 295 has been withdrawn, by means of the lever 289, to trip the clutch-plate 296, whereby said catch 295 may intercept said trip-plate 296 to disengage the clutch mechanism, not shown, at the end of the cycle of the shaft 297.

It may be noted here that rocking of the shaft 278 from the Figure 1 position to the Figure 12 position also drops the fulcrum-rod 106 for the levers 105 of the register-selecting trains and thereby also disables the register-selecting cam-plates 85; said fulcrum-rod 106 being supported in a frame 305 depending from arms 306 of said rock-shaft 278. Conversely, restoration of said rock-shaft 278 during the cycle of the shaft 297 restores said cam-plates 85.

The cam-spur 177 on the date type-bar controlling cam-plate 127 may be idly displaced by the tappet 130 or 196, without depressing said cam-plate, during the return run of the carriage as in Figure 11. For this purpose said cam-spur 177 is formed at the end of a pawl 307 slidably retained against the back of said cam-plate 127 by means of a headed pawl stud 308 slidably fitting an oblique cam-plate slot 309. Said pawl stud 308 normally abuts the upper end of said oblique slot 309 and the pawl 307 is urged to rotate counter-clockwise about the axis of said stud 308 by a spring 310 so that a shoulder 311 of said pawl 307 normally rests upon a shoulder 312 of said cam-plate 127 to support said pawl in effective position, Figure 10. Said spring 310 is connected to the cam-plate at 313 and to another headed pawl stud 314 having play transversely of a cam-plate slot 315 through which it passes, said play permitting the pawl 307 to turn about the axis of the stud 308. When the date type-bar controlling tappet 176 encounters said pawl 307 during the carriage return run it slides the pawl rightward off the cam-plate shoulder 312 so that the cam-spur 177 thereon becomes suppressed into a cam-plate recess 316 under the direction of the oblique cam-plate slot 309 as in Figure 11, it being noted that the turning movement of which the pawl 307 is capable about the stud 308 permits the pawl to so slide off said shoulder 312 and its cam-spur 177 to so enter said recess 316 as to prevent said tappet 176 from depressing the cam-plate 127 as in Figure 11. After the tappet 176 has passed said cam-spur 177 in the carriage-return run, the pawl-spring 310 restores the pawl 307 to the normal position seen in Figures 3, 10, 13 and 18.

The date-printing mechanism may also be silenced preparatory to moving the carriage, in letter-feeding direction, through a zone for which the date column unit D is set; as for example, when it is desired to use the typewriting mechanism for ordinary typing operations in said zone. For this purpose there are provided means, similar to those described in my aforesaid application No. 72,348, for using the above described jack-disabling mechanism independently of its connections to the carriage-return engaging train; and herein there are associated with said means devices to render ineffective the date type-bar controlling train that starts with the cam-plate 127 and leads to the date type-bar operating draw-link 173.

In said date-printing silencing means, Figures 1, 3, 15 and 16, a key-bar 318 is manually displaced rearwardly by means of a key 319 thereon, from the Figure 1 position to the Figure 16 position to rock arms 320, 321, connected by a yoke 322, to turn the rock-shaft 286 and its latch-arm 281 clockwise to release the latch-plate 279 and thereby disable the jacks 92, 128, 135, 258, in a manner similar to that hereinbefore described. Said arm 320 is pivoted to the key-bar 318 and supports the latter at 323; and the companion arm 321 has a one-way connection 324 to said rock-shaft 286 to permit the latter to be rocked to jack-disabling position independently of said arms 320, 321. At its forward end the key-bar 318 is slidably supported by the framework as at 325. A latch 327, pressed by spring 328 and loosely pivoted on the rock-shaft 138, interlocks with a lug 329 of the arm 320 as the latter becomes rocked to the Figure 12 position to thereby detent said arms 320, 321 and the latch-arm 281 in jack-disabling positions as in Figure 16.

Incidentally to thus disabling the jacks by means of the key-bar 318 the aforesaid date typebar controlling train is also disabled. For this purpose a switch-plate 331 mounts the stud 182 on the sub-plate 179 and is swingable, about its pivotal connection 332 to said sub-plate, to move said stud forwardly to clear the arm 183 as in Figure 16 to disable the train. Said switch-plate 331 is so swung by the arm 321 that co-operates with the key-bar 318, engaging as at 333, an arm 334 on a rock-shaft 335 having an arm 36 engaging the switch-plate 331 as at 337; said rockshaft 335 being journaled in brackets 338 on the framework. In the normal positions of the parts the switch-plate 331 pressed by the spring 202 abuts the cross-bar 194 in the housing 86 as at 320 in Figures 1 and 3.

For restoring the date-printing-mechanism, when silenced by means of the key-bar 318, to operative condition a cycling key 339 is depressed as in Figure 15 and thereby, by means of a bellcrank 341 pivoted on the framework, displaces a slide 342, mounted for endwise horizontal movement on the framework as at 343, Figure 1, rearwardly. Said slide 342 engages as at 343, the arm 304 of the cycle-trip shaft 294 to rock the latter to release the clutch plate 296 for a resulting cycle of the shaft 297. At the same time said cycling-key controlled arm 304 depresses the latch 327, as in Figure 15, to release said key-bar 318, the arms 320, 321 and the latch-arm 281 for restoration, aided by key-bar spring 345, to normal positions; the switch-plate 331 urged by its spring 202, thereby also returning to normal position. In said cycle the cam-roller 299 of the shaft 297 restores the latch-plate 279, its rock-shaft 278 and the thereby supported fulcrum rod 97 to normal positions wherein the latch-arm 281 re-engages latch-plate step 280. The one-way connection 324 of the arm 321 to the rock-shaft 286 carrying said latch-arm 281 permits restoration of the arms 320, 321, key-bar 318 and switch-plate 331 to immediately follow the depression of the latch 327 without waiting for the latch-arm 281 to re-engage the latchplate step 280 in said cycle.

At the setting of the key-bar 318 to the dateprint-disabling position, Figure 16, the pawl 292, Figures 12, 16, by means of which restoration of the carriage-return-engaging train trips the cycling clutch, is turned to disabled position, Figure 16, said pawl being engaged as at 346 by the arm 321 that co-operates with said key-bar 318.

Provision is made to permit the carriage to be tabulated to skip the date-column zone without printing the date; as when it is desired, for example, to write the address at the head of the work-sheet 90, Fig. 17. Instead of operating the tens of cents denominational tabulating key 70 which would bring the carriage to the position whereat repeated letter-spacing and date-printing would automatically ensue, as in Figure 13 or 17, the units of dollars denominational tabulating key 70 would be operated, whereby its stop 71ᵃ indicated by the dot-and-dash outline, Figure 17, would coact with the column-stop 215, seen in Figure 17 on the unit D, thereby causing the carriage to be tabulated to the position whereat the tappet 130 would be two letter-spaces to the right of the escapement-controlling jack 128, it being remembered that the units of hundreds dollars stop 71ᵃ is separated from the tens of cents denominational stop 71 by a punctuation space 347, Figure 3. If the column-stop 214 is arranged on the unit D as at Figure 13, the units of dollars tabulating key 70 may also be operated, causing the carriage to be tabulated to the position whereat the date type-bar controlling tappet 176 would be two letter-spaces to the right of the cam-spur 177 on the date type-bar controlling cam-plate 127. The units of dollars tabulating key is then operated again, causing the carriage to tabulate through the date zone to the first letter-space in the description column and without operating the date-printing mechanism. For these purposes elevation of any denominational stop 71 (also 71ᵃ) rocks a universal bar 348, Figure 1, to depress a cam-link 349 connected as at 350 to a universal bar rock-shaft 351 journaled in the framework. The lower end of said cam-link 349, slidably guided in a fixture 352 on the framework, has a cam 353 to rock a horizontal lever 354 about a vertical pivot 355, and said lever 354 thereby draws rearwardly a link 356 so that a lock-tongue 357, Figures 1 and 3, of the latter enters between two of a series of lock-rods 358 and thereby locks said series against the admission of any other element; it being noted that fixed end-stops 359, 360, Figures 3 and 29, limit the endwise movement of said lock-rods 358, the latter being supported on a grooved flange 344, Figure 3, of the stop-bar 203. Fixture 352 and the stop-bar 203 slidably support the link 356; and said link 356 and camlink 349 have restoring springs 361, 362 operative to restore the parts when the tabulating key 70 is released. The so-far described portion of the locking mechanism associated with the tabulating keys 70 is substantially as described in my co-pending application No. 63,627, filed February 12, 1936. In the present machine the lock-rods 358 are arranged to prevent, when the tabulating key 70 is operated, admission of either the escapement actuating draw-link 131 or the datetype-bar actuating draw-link 173 and thereby prevent connection of said draw-links to the snatch-roll 132. Said flange 344 has vertical slots, Figure 3, to admit the draw-links 131, 173.

The draw-link train from the escapement controlling jack 128 has a resiliently yieldable connection 365 and similarly, the train from the type-bar controlling cam-plate 127 has a resiliently yieldable connection 364. Said connections 364, 365 permit said jack 128 and cam-plate 127 to yield idly as in Figure 29, when engaged by the date-column unit D, so as not to block movement of the carriage, through the date-printing zone when the tabulating key 70 is operated and blocks the draw-links 131, 173, by means of the lock-link 357 and lock-rods 358 as in Figure 29.

In the yieldable connection 364, Figure 10, the arm 184 is rotatably loose on the rock-shaft 180 and provided with an arm-hub perforating slot 340, one end of which and a stop-pin 326 in said rock-shaft 180 are normally kept in abutment by a spring 363, the latter being connected to said arm 184 and to said stop-pin 326. Thus the rock-shaft 180 when rocked by depression of the cam-plate 127 may yield resiliently by way of said spring 363, that is moved independently of the arm 184 when the latter is blocked through blocking of the date type-bar draw-link 173 by the lock-rods 358 at operation of a tabulating key 70. It will be obvious, Figure 10, that the yieldable connection 365 is similarly constructed to permit the escapement-jack operated arm 165 to yield relatively to the rock-shaft 138 when the latter is blocked through similar blocking of the escapement draw-link 131 by said lock-rods 358. In Figures 10, 17, and 30 a unit T is shown placed on the carriage for tabulating the latter to the "Invoice" column, by means of a suitable denominational tabulating key 70, preparatory to tabulating the carriage for skipping the "Date" column; and a similar unit TT, see also Figure 29, is placed for arresting the "Date" column skipping jump of the carriage at the first letter-space in the "Description" column.

The date-column-unit D is placeable anywhere along the carriage for different locations of the "Date" column on the work-sheet. Figure 18 represents said unit D placed for printing the date at the start of a line of typing and further represents the carriage as having reached the extreme of its return movement and ready to take the usual drop back step after banking against the margin-stop 269, diagrammatically indicated, Figure 18, a suitable form of said margin stop and co-operative stop on the carriage being shown in Patent 1,835,776 to Helmond, dated December 8, 1931. At the end of said dropback step, the tappet 130 may have partly or fully traversed the escapement-controlling jack 128. In the former case, said jack 128 will be operated to advance the carriage substantially as hereinbefore described preparatory to depression of the date type-bar controlling cam-plate 127 by the tappet 176; while in the latter case said cam-plate 127 will be depressed immediately for resulting immediate operation of the date type-bar 111 at the end of said drop-back step; it being understood that following the date type-bar operation the secondary escapement-controlling tappet 196 comes into play to advance the carriage to bring the first column date imprint clear of the printing point represented by the center type guide 50. The carriage may also be letter spaced by means of the usual space-key, not shown, or tabulated from the drop-back position following the carriage return, in order to bring the date-unit D into play for printing the date at the beginning of a line.

The date-type bar 111, Figures 23–27, includes a type-carrying-upper member 366 that, for convenience in changing the type-slugs or insert 113, is separable from a lower member 367 that remains in the type-bar-mounting segment 38, said lower member being permanently connected to the companion bell-crank 118. Said upper member 366 has a longitudinal slot 368 forming spaced legs 369; and said lower member 367 has slots 370 along opposite edges thereof to form a web section 371 fitting said upper member slot 368 and to also form side walls 372 abutting said legs 369, to prevent relative lateral displacement of said upper and lower members 366, 367. The lower member 367 may be reduced in thickness at its lower-end part, that is, below the shoulder 373, to fit the segment slot 114. For preventing the legs 369 of the upper member 366 from spreading and causing objectionable looseness of the latter, a cleat 375 forms abutments 376 for engaging the outer edges of said legs 369, as at 374, to prevent said spreading of the latter, and is preferably fastened to said lower member 367 as by a rivet 377. The slot 370 may end in a slope or flare 363. The lower end of the leg 369 of the upper type-bar member 366 may be confined or wedged between said flare 363 and the abutment 376 of the cleat 375 to conduce to holding said upper member 366, and companion lower member 367 together rigidly. Said rivet 377 also secures a flat spring 378 which mounts and keeps a lock-stud 379 normally in position to engage notches 380 in the sides of the upper-member slot 368, to interlock said upper and lower members 366, 367. Said stud 379 passes through a suitable hole in the lower member 367 and has a reduced neck 381 over which said upper member 366 may pass, for removal or replacement upon moving said stud 379 endwise and incidentally pressing said flat spring 378 outwardly by means of a finger-piece 382 on said stud 379. Said upper member 367 may be struck up from a sheet metal blank to form a box or socket 383 for the date-type 113, said blank being arranged to afford a top 384, bottom 385, sides 386, 387, and back 388 for said box; the sides 387 extending downwardly and being bent as at 389 to form a stem 390, inclusive of the legs 369 of said upper member 366. A type-end-seating block or rod 391 sufficiently long to afford an abutment for the forward ends of the several types 113 is provided in said box 383 and abuts the back 388 of the latter as in Figure 26. A bail-like clip 392, formed preferably of spring wire, includes a type-retaining cross-piece 393 that engages the shoulder forming side of a notch 394 provided in each type-slug 113, said clip also including side arms 395 for attachment to the type-box 383. Said side arms 395 may have ends 396 bent inwardly for hinging the clip to the type-box, whereby the clip is swingable between the type-retaining position, Figures 23–26, and the type-releasing position shown by the dot-and-dash outline of the clip in Figure 26. The turned-in hinging ends 396 of the side arms are received in holes 398 in the type-box and such holes may extend into the type-end seating block 391 as shown in Figure 26. Said holes are shown oversize as compared with said hinging ends 396, to facilitate removal or replacement of the clip 392 in the type-bar.

The clip 392 is normally held in type-retaining position by detent knobs or points 397 provided on the sides of the type-box 383 to engage the side arms 395 of the clip; it being understood that said side arms will yield resiliently to override said detents 397 when it is desired to move the clip between the type-holding and type-releasing positions, seen in Figure 26. The clip side arms 395 are bent as at 399 so that in the normal position of the clip they rest against the upper sides of the detents 397. In the effective position of the clip said detents tend to cam the side arms 395 upwardly and cause the clip cross-piece 393 to react against the shoulder-forming sides of the notches 394 of the types 113 so as to hold the latter against the type-end seating block 391. The upward camming pressure of the detents 397 upon the clip also tends to shorten the side-arms 395 by tending to increase the bends 399, thereby conducing to cause the clip 392 to hold the types securely in the box 383.

The outer two of the three types 113 have each a lateral outward projection 400, while the middle type has straight sides. This, in conjunction with the notches 394, provides against improper relative placement of the types in the box 383; it being noted also that the notches 394 are readily visible in that they are outside of said box 383.

Operation of the date-type-bar 111 may also be effected manually. For this purpose the date-type-lever 117 extends forwardly to the typewriter keyboard, Figure 1, and is provided thereat with a finger-key 401; and the link 175 has a pin-and-slot connection 402 to said date-typing lever 117 to permit manual date type-operating depression of the latter independently of the train 173—175 by which the snatch-roll 132 operates said date-type lever 117. A face 403 of the upper member 366 of the date type-bar 111 strikes the stop-anvil 52 of the segment 38 to arrest the date type-bar printing stroke so as to cause the date type-bar to print by whip action of its upper part.

The operation of the machine will be understood in detail from the foregoing description and may be summarized as follows with reference, by way of example, to the work-sheet 90, Figure 10.

At the typing of an amount in the Old balance column the computing unit C, the first from the left, Figure 10, on the carriage, co-operates to index said amount in one or more predetermined sets of register-bars 76, depending on the provision of register-selecting teeth 87. Said unit C may also have a column-stop 410, Figure 17, for tabulating the carriage to said Old balance column upon operation of a selected denomination tabulating key 70. After typing the Old balance the machine is cycled, as by pressing the cycling key 339, to enter the Old balance in the predetermined register or registers.

The carriage is then advanced to the "Invoice" column, as by pressing the appropriate denomination tabulating key 70, there being provided for the "Invoice" column the column unit T, Figure 10, on the carriage having a column-stop 405 but no register-controlling teeth 87 or 91.

At the carriage letter-feeding step which follows the typing of the last "Invoice" numeral, the "Date" column-unit D on the carriage comes into play in that the tappet 130 thereof depresses the escapement controlling jack 128, as in Figure 7, thereby, through the hereinbefore described connections, rocking the lever 140 to the Figure 4 position to connect the escapement-operating draw-link 131 to the rotating power-operated snatch-roll 132. The resulting rearward movement of said link 131 by said snatch-roll rocks the escapement rocker 57 clockwise; said draw-link 131 becoming disconnected from the snatch-roll 132 as it encounters the cam-nose 157. The momentum of a fly weight 406, Figure 4, which may be provided on the lever 143 connected to said draw-link 131, insures completion, independently of the snatch-roll 132, of the rearward stroke of said draw-link, it being noted that said draw-link 131 may be disconnected from said snatch-roll, by the cam-nose 157, a little before the completion of said rearward stroke. Following disconnection of the draw-link 131 from the snatch-roll and the completion of its rearward stroke, the spring 158 moves said draw-link forwardly again thereby causing the escapement rocker 57, aided by its spring 62, to turn counter-clockwise; it being understood that this counter-clockwise rocking of said rocker 57 following the first described clockwise rocking of the latter causes, in cooperation with the escapement wheel 60 and carriage spring motor 67, the carriage to advance a letter-feeding step.

In the meantime the jack 128 remains depressed, and therefore the tab 142 of the draw-link controlling lever 140 remains elevated by reason of the dwell 130$^a$ of the tappet 130 on the "Date" column unit D on the carriage; and it results that the draw-link 131, as it is urged by the spring 158 to complete its forward movement is at the same time cammed or deflected upwardly into re-engagement with the snatch-roll 132 when the cam-edge 159 of said draw-link 131 encounters said elevated tab 142, this being apparent in Figure 5 which shows the forwardly moving draw-link 131 about to become cammed upwardly again into engagement with said snatch-roll 132.

At said reconnection of the draw-link 131 to the snatch-roll 132 the carriage-feeding operation is repeated; and further repetitions follow and end with the letter-feeding step in which the tappet dwell 130$^a$, ending at the edge 130$^b$, leaves the depressed jack 128 whereupon the latter and its train to the lever 140 become restored and releases the draw-link 131 and its train. The parts now are in the position of Figure 10 wherein the "Date" column of the work-sheet 90 is shown in position to receive the date-imprint. Thus the described repeated operations of the escapement automatically advance the carriage step by step to bring the work-sheet to the Figure 10 position following the printing of the last Invoice numeral.

And by the last carriage step, which releases the jack 128 and positions the work-sheet 90 to receive the date-imprint, the tappet 176 of the "Date" column unit D on the carriage has come into play and depressed the date type-bar controlling cam-plate 127 as in Figure 10 thereby, by means of the hereinbefore described connections from said cam-plate 127 causing the date type-bar draw-link 173 to become elevated and connected with the rotating snatch-roll 132. The resulting rearward stroke of said date type-bar draw-link 173 rocks the lever 174 to depress the date type-bar lever 117 and swing the date type-bar 111 to the platen to print. By the time the date type-bar 111 reaches the platen, its draw-link 173 will have become disconnected from the snatch-roll 132, by means of the cam-nose 157, as seen in Figure 6 so that following the date-imprint the type-bar 111 is free to rebound. At the printing and rebound strokes of the date type-bar 111 the heel 55$^a$ of the latter co-operates with the escapement universal bar 54 and the escapement devices to move the carriage a letter-space step following the date-imprint. By said latter step the secondary escapement-controlling tappet 196 of the "Date" column unit D on the carriage comes into play to depress the escapement-controlling jack 128 and thereby advance the carriage a further letter-space step in that the so depressed jack 128 connects the escapement draw-link 131 to the snatch-roll 132 for an ensuing operation of the escapement-rocker 57. The jack 128 remains depressed by reason of the dwell 196ᵃ of said secondary tappet 196 so that further repetitions of operation of the escapement mechanism follow in substantially the same manner as was explained with reference to the tappet 130, it being noted that said repetitions end with the step in which the dwell 196ᵃ, ending at the edge 196ᵇ, leaves and releases said jack 128. At such last step, effected by means of the tappet 196, the work-sheet 90 will have been advanced to bring the date-imprint clear of the printing point; or, as is provided for in the instant construction, to bring the first printing place in the "Description" column of the work-sheet to the printing point.

Referring again to the date type-bar controlling tappet 176, it may be remembered that the dwell 176ᵃ of the latter keeps the date type-bar controlling cam-plate 127 depressed following the date printing operation of the date type-bar 111. Said dwell 176ᵃ, ending at the edge 176ᵇ, may pass from and release said cam-plate in the last step of the described series of carriage steps, controlled by the tappet 196, which brings the first place in the "Description" column to the printing point.

Said prolonged depression of said cam-plate 127 keeps the tab 188 of the date type-bar draw-link lifting lever 181 in elevated position as in Figure 6 to block full forward restoration of the date type-bar draw link 173 by its spring 197; but said spring fully restores said draw-link 173 downwardly against the stop-bar 203 so that the draw-link stop edge 199 will strike the rear face of the elevated tab 188, as will be apparent from Figure 6, to check full forward restoration of said draw-link 173. It will be understood of course that said draw-link 173 moves forward sufficiently, before being arrested by said elevated tab 188, to permit the date type-bar 111 to recoil far enough to release the universal bar 54 for completing operation of the escapement devices for the letter-feed step of the carriage which follows the date-imprint.

Figure 28 shows a modified date type-bar-controlling tappet 407 on the "Date" column unit D, and a modified co-operative cam-spur 408 on the cam-plate 127 designed, as will be apparent, so that said tappet 407 leaves said cam-spur 408 and releases said cam-plate 127 in the letter-space carriage step that results from the date type-bar operation effected by said tappet 407. Thus, by employing said Figure 28 tappet and cam-spur form instead of the dwell-including form previously described with refernce to the tappet 176, the date type-bar 111 and its draw-link 173 may become fully restored immediately following the date-imprinting operation. Said modified cam-spur 408 may form part of an element like the pawl 307, Figure 11, in order that it may be idly by-passed by said tappet 407 without depressing cam-plate 127 in the return run of the carriage, substantially in the manner hereinbefore described.

It will be seen that in sequence to the operator typing the last numeral in the "Invoice" column and before the operator types the first character in the "Description" column, the operator rests while the machine operates automatically to print the date in the proper location of the work-sheet and also operates automatically to advance the carriage the appropriate number of letter-spaces for, first, positioning of the carriage for the date-imprint by means of the tappet 130 and, then, after the date-imprint, positioning the carriage by means of the secondary tappet 196 for said first character of the "Description" column. The operator proceeds, after such automatic date-printing and carriage-spacing operations have taken place, to complete the typing in the columns or portion of the line following the date. For each computing column after the "Date" column, as for instance, the "Debit" column, Figure 10, a computing unit C having appropriate register-controlling teeth or tappets 87, 91 is provided on the carriage; and for each non-computing column, such as the "Order" column, following the date, a unit such as T or TT may be provided for tabulating purposes only.

Following the completion of a line of typing the carriage-return key 261, Figure 12, may be pressed. The resulting engagement of the carriage-return parts, as in Figure 12, rocks the latch-arm 281 to release the latch-plate 279 to cause the jacks, including the escapement-controlling jack 128, to drop so that said jack 128 will not be operated by the tappets 130, 196 on the date-column-unit D to work the carriage escapement during the carriage-return run. The date-type-bar-controlling tappet 176 on said unit D also idly over-rides and pushes aside (rightward), as in Figure 11, the cam-spur 177 of the date-type-bar-controlling cam-plate 127 to prevent depression of the latter and, consequently, prevent operation of the date-type-bar 111 during the carriage-return run. At the restoration of the carriage-return parts by means of the dog 272 at the end of the carriage-return run, the lever 289 is also restored upwardly from the Figure 12 position and thereby over-rides the pawl 292 on the arm 293 of the cycle-tripping rock-shaft 294 to rock the latter for a resulting cycle of the general operator mechanism in the computing base. Said cycle operates to restore the jacks, including the escapement-controlling jack 128 associated with the date-printing mechanism back to operative position.

The carriage may also be tabulated, instead of automatically spacing it by means of the escapement-controlling tappet 130, for bringing the "Date" column to the Figure 10 date-imprint-receiving position. For such practice said tappet 130 may be omitted from the "Date" column unit D in that the latter has only the secondary escapement-controlling tappet 196, Figures 13 and 14. For so tabulating the carriage, the tens of cents denomination key 70 is operated either after typing the last numeral in the "Invoice" column, or, after a primary operation of said tabulating key and its denominational stop 71 to coact with the column unit T for skipping the "Invoice" column. Thus, either following skipping of the "Invoice" column, or writing the last numeral therein, the tens of cents denominational stop 71 and the column-stop 214 on the carriage may co-operate as in Figure 13 from which it will be apparent that at the usual slight carriage advance which follows the retraction of said stop 71, the Date type-bar-controlling tappet 176 will engage the cam-spur 177 and depress the cam-plate 127 for immediate operation of the Date type-bar 111. At the letter-space step accompanying the date-imprint, the secondary escapement-controlling tappet 196 comes into play as hereinbefore described to co-operate with the jack 128 to automatically advance the carriage by repeated letter-space steps to the first character place in the "Description" column.

The carriage may also be tabulated for the "Date" column when provision of the tappet 130 is retained on the "Date" column unit D as, for example, when it is desired to merely skip the "Invoice" column. In such case and before the carriage reaches the "Invoice" column position, the tens of cents denominational stop 71, for instance, is projected by its key 70 and necessarily coacts first with the column-stop 405 of the "Invoice" column unit T to halt the carriage at the "Invoice" column preparatory to passing the latter by a repeated projection of said tens of cents denomination stop 71; it being apparent that this will bring the carriage to the Figure 17 position and that upon retraction of said stop 71 the resulting slight carriage advance will cause the tappet 130 to depress the escapement jack 128 for advancing the carriage by repeated letter-space steps to the date-imprint position, Figure 10, substantially as hereinbefore described.

For preventing operation of the date-printing devices at the advance of the carriage through a zone for which the date-column unit D is set, the throw-off key-bar 318 is set rearwardly from the Figure 1 position to the Figure 16 position. This is done when it is desired, for example, to type the address "John Brown, etc.", Figure 17, at the head of the work-sheet, the address and the "Date" column including the same zone of carriage travel. Said rearward setting of said throw-off key-bar 318 operates through the train, comprising arms 320, 321, 334, 336, to swing the switch-plate 331, in the date-type-bar-controlling train, to the Figure 16 position. Thereby said train becomes disrupted as is indicated by the stud 182 and arm 183 being out of operative alignment; said train starting with the cam-plate 127 and ending with the arm 187 that controls the date-type-bar draw-link 173. Rearward setting of said throw-off-key-bar 318 also operates, through arms 320, 321, to rock the shaft 286 and its latch-arm 281 to release the latch-plate 279 and its rock-shaft 278 for resulting rearward displacement of the fulcrum rod 97 to the Figure 16 position so that the escapement jack 128 is free to drop idly. The rearward setting of said throw-off key-bar 318 is maintained by the latch 327 interlocking with the arm 320 as in Figure 16. The rearward setting of said key-bar 318 also swings the pawl 292 to the Figure 16 position and thereby renders it ineffective, it being remembered that said pawl normally co-operates at disengagement of the carriage-return mechanism, see Figure 12, to trip the cycling mechanism in the computing base. This displacement of said pawl provides for use of the carriage-return mechanism, as in typing said address, without needlessly working said cycling mechanism while said key-bar 318 is set as in Figure 16.

Restoration of the date-printing devices to operative condition is effected by pressing the cycling key 339 and thereby rocking the arm 304 downwardly to trip the latch 327 as in Figure 15 to release the throw-off key 318 for resulting restoration to the Figure 1 position by its spring 345. Operation of the cycling mechanism in the computing base also results from said operation of the said cycling key 339 and works to restore and relatch the plate 279 as in Figure 1 and thereby restore the escapement-jack 128 to operative condition. The restoration of the throw-off key-bar 318 also results in restoration of the switch plate 331 so that the stud 182 and the arm 183 of the date-type-bar-controlling train are also restored to operative alignment as in Figure 1.

The tabulating mechanism may be used to skip the "Date" column without causing operation of the Date-printing type-bar 111 by way of the cam-plate 127, or of the escapement devices by way of the jack 128. To this end, operation of the tabulating key 70 is effective by means of the train 349, 354, 356, Figure 1, to close up the lock-rods 358, see also Figure 3, so that said lock-rods block and thereby prevent connection of the escapement draw-link 131 or of the Date type-bar draw-link 173 with the snatch-roll 132. As the carriage is tabulated through the "Date" column zone to skip the latter, said jack 128 and cam-plate 127 are depressed idly by reason of the flexible connections 364, 365 in the described trains leading to said blocked draw-links 131, 173. It may be pointed out that if it be desired to thus skip the "Date" column after first typing in an immediately preceding column like the "Invoice" column, Figure 10, there may be used, the date-column-unit D, Figure 13, having only the secondary tappet 196 for the escapement. Thus, to skip the "Date" column after typing the last numeral in the "Invoice" column, the units of dollars denomination tabulating key 70 is depressed, causing the carriage to be tabulated and settled in the position wherein the Date-type-bar-controlling tappet 176 is two spaces to the right of the cam-spur 177 of the Date-type-bar-controlling cam-plate 127. As the carriage settles in said position after retraction of the units of dollars denomination stop 71ª, the latter will be to the right of the tabulating stop 214 on the Unit D and it therefore will be apparent that a repeated operation of said units of dollars denomination stop 71ª by its key 70 as in Figure 29, will cause the "Date" column to be skipped and the carriage to be arrested with the tabulating stop TT for the "Description" column encounters said denominational stop 71.

The Date type-bar 111 may register on the platen without engaging the center type-guide 50 in that the latter may be cleared by the portion 387 of the Date type-bar, as in Figures 2 and 10. It will be understood that the ink-ribbon 129 and its vibrator 126 co-operate with the Date type-bar 111 by means of the universal bar 54.

It will be understood that the snatch-roll may be mounted and journaled as, for example, in the typewriter frame 39, and may rotate continuously in the direction of the arrow, Figure 1, about a fixed axis during use of the machine, and that for such rotation said snatch-roll may be connected to and driven by a suitable electric motor, not shown.

The typewriter rests, as at 411, Figure 1, upon cross-bars 163, 413 of the computing-base B and may be lifted from the latter after removing hold-down screws 412 and disconnecting the key-bar 318 from the arm 320.

Variations may be resorted to within the scope of the invention, and portions of the improvements may be used without others.

Having thus described my invention, I claim:

1. In a typewriting machine of the character described, the combination with types individually operable to print at a common printing point, a carriage, and carriage-escapement-mechanism co-operative with said types to advance said carriage in single-letter-spacing steps, of a group of types operable to print collectively to effect a given date or like imprint covering a plurality of letter-spaces, said date imprint being contiguous to said printing point and being effected at a predetermined place in the carriage travel, tappet means connected to said carriage, means operative under control of said tappet means at said predetermined place in the carriage travel to automatically operate said group of date printing types collectively, other tappet means connected to said carriage, and means operative under control of said other tappet means relatively to said predetermined place in the carriage travel to repeatedly work said escapement a predetermined number of times, whereby said carriage is automatically advanced for said plurality of letter-spaces incidentally to the automatic operation of said group of date printing types.

2. In a typewriting machine of the character described, the combination with types individually operable to print at a common printing point, a carriage, and carriage-escapement mechanism co-operative with said types to advance said carriage in single-letter-feeding steps, of a group of types operable to print collectively to effect a given date or like imprint covering a plurality of letter-spaces, said imprint being contiguous to said printing point and being effected at a predetermined place in the carriage travel, tappet means connected to said carriage, and means operative under the control of said tappet means relatively to said predetermined place in the carriage travel to repeatedly work said escapement-mechanism a predetermined number of times, whereby said carriage is automatically advanced for said plurality of letter-spaces incidentally to the operation of said group of types.

3. In a typewriting machine, the combination with a typewriting carriage, and a letter-feed escapement mechanism therefor, of a group of types operable to print collectively to effect a given date or like imprint covering a plurality of letter-spaces, a controller on the carriage for said group of types, another controller on the carriage for said escapement-mechanism, said controllers being placed on the carriage relative to a date zone of the carriage travel, and operating mechanism, including power means, for operating said group of types and said escapement, said operating mechanism including parts engaged by said controllers at the date zone and being operative in response to such engagement of said parts to operate said group of types collectively to effect said date imprint in a single printing stroke and, in correlation with said type operation, to operate said escapement-mechanism repeatedly to advance said carriage consonantly with said plurality of letter-spaces.

4. A machine constructed according to claim 3 inclusive of a unit incorporating said controllers, said unit being adjustable along the carriage to variably predetermine the date zone in accordance with different forms of work-sheets.

5. In a typewriting machine, the combination with a typewriting carriage, and a letter-feed escapement-mechanism therefor, of a group of types operable to print collectively to effect a given date or like imprint covering a plurality of letter-spaces, an operating mechanism, including power means, for operating said group of types or said escapement, said operating mechanism including a jack operable to effect operation of said group of types, and another jack operable to effect operation of said escapement, and tappet means placed on the carriage relative to said date zone, said tappet means including a tappet to engage and operate the type-controlling jack, and also including a tappet to engage and operate the escapement-controlling jack, whereby said group of types is automatically operated to print the date and the escapement is operated to advance said carriage consonantly with said plurality of letter-spaces.

6. The combination with a typewriter carriage, and a letter-feed mechanism therefor including an escapement rocker, of devices operable under control of said carriage as the latter reaches a predetermined letter-space position in its advance to automatically advance the carriage a predetermined number of letter-feeding steps, said devices including a jack, means, including a power device, responsive to a sustained displacement of said jack to actuate said escapement rocker repeatedly, and means co-operative with said carriage to effect said displacement and to determine the duration of said displacement so as to effect a predetermined number of repetitions of operation of said escapement rocker to thereby automatically advance said carriage said predetermined number of letter-feeding steps.

7. The combination with a typewriter carriage, and a letter-feed mechanism therefor including an escapement rocker, of devices operable under control of said carriage as the latter reaches a predetermined letter-space position in its advance to automatically advance the carriage a predetermined number of letter-feeding steps, said devices including a jack, means, including a power device, responsive to a sustained displacement of said jack to actuate said escapement rocker repeatedly, and a tappet on said carriage operative to displace said jack as the carriage reaches said predetermined letter-space position, said tappet having a dwell to sustain said displacement for a predetermined number of letter-space steps in the ensuing advance of the carriage, said jack becoming restored as said dwell passes therefrom and thereby terminates said advance.

8. In a machine of the character described, having singly operable typewriter types, the combination with a carriage and letter-feed escapement-mechanism, including a universal bar, co-operating with said types, of a group of types operable collectively to effect at a single printing stroke in a given zone of the carriage travel a date or like imprint covering a plurality of letter-spaces, a primary letter-feed control on the carriage, means co-operative with said primary control at said zone to work said escapement-mechanism repeatedly to effect a primary part of said plurality of letter-spaces preparatory to a date-printing operation of said group of types, said universal bar co-operating at the single date-printing stroke of said group of types to actuate said escapement-mechanism for a single letter-space step included in said plurality of letter-spaces, and a secondary letter-feed control on said carriage, co-operative with said means that co-operated with said primary control, to work said escapement-mechanism repeatedly, to effect the remaining part of said plurality of letter-spaces, said primary and secondary controls being placed on the carriage relatively to said date-printing zone.

9. A machine constructed according to claim 8 inclusive of a date-type control located on the carriage relative to said date-printing zone, and means co-operating with said date-type control to effect said single stroke of said group of date-types automatically in sequence to said primary part of said plurality of letter-spaces, said single letter-space step and the remaining part of said plurality of letter-spaces following said automatic date-type operation.

10. For use in a date-printing mechanism of the character described having a carriage, a letter-feed mechanism therefor, a group of date-printing types, a jack depressible to automatically effect a date-printing collective operation of said group of types, and also having a jack depressible to work said letter-feed mechanism repeatedly consonantly with a plurality of letter-spaces covered by the date-imprint; control means on the carriage including a supporting rack, and a unit placeable at different stations along said rack according to determination of different locations of the date-printing zone in the range of carriage travel, said unit having a tappet for depressing the letter-feed-controlling jack and also having a tappet for depressing the jack controlling the operation of the group of date-types.

11. In a machine of the character described, having a typewriter carriage, and jack devices traversable by said carriage to control certain mechanism; jack-controlling means on the carriage including a front supporting rack, a rear supporting rack, said racks being mounted on the carriage one behind the other, and a jack-engaging tappet unit including a tappet-carrying body extending transversely of said racks, said body being insertable forwardly to interlock its front end with the front rack, the rear end of said body having laterally spaced teeth to interlock with said rear rack, said rear end of said body also having laterally spaced clips co-operative with said teeth to embrace said rear rack at laterally spaced planes to support said unit against twisting or cocking as said tappets engage said jacks, said rear rack being vertically offset from said body and said teeth and clips being arranged to permit said rear teeth and clips to engage and embrace said rear rack at the forward front rack engaging insertion of said unit and to permit release of said unit from said front and rear racks by rearward withdrawal of said unit.

12. In a typewriter of the character described, a date-printing mechanism including, in combination with the reciprocatory typewriting carriage and the letter-feed escapement-mechanism therefor, a group of types operable collectively to effect at a single printing stroke a date-imprint, covering a plurality of letter-spaces, control devices on the carriage, means automatically operative under control of said control devices, when said carriage reaches a predetermined date-printing zone in its range of letter-feed travel, to effect operation of said group of types and to effect, repeatedly, operation of said escapement-mechanism consonantly with said plurality of letter-spaces, said means including parts engaged by said control devices to effect said operations, and means effective to automatically prevent operation of said group of types and escapement-mechanism when said control devices traverse said parts during a return run of the carriage.

13. In a typewriter of the character described, a date-printing mechanism including, in combination with the reciprocatory typewriting carriage and the letter-feed escapement-mechanism therefor, a group of types operable collectively to effect at a single printing stroke a date-imprint covering a plurality of letter-spaces, control devices on the carriage, means automatically operative under control of said control devices, when said carriage reaches a predetermined date-printing zone in its range of letter-feed travel, to effect operation of said group of types and to effect repeatedly, operation of said escapement-mechanism consonantly with said plurality of letter-spaces, said means including parts engaged by said control devices to effect said operations, a silencing key, and means co-operative with said key to predetermine prevention of said operations of said group of types and escapement-mechanism when said control devices traverse said parts during advance of the carriage in letter-feeding direction, said key and preventing means being usable at will preparatory to typing matter other than the date within the date zone of carriage travel.

14. In a typewriting machine having conventional individually operable types and a letter-feeding carriage co-operative therewith, the combination with said carriage of a type device usable at a predetermined place in the carriage advance for each of successive lines of typing to effect a certain imprint, as, for instance, a date, a tappet located on the carriage relatively to said place, means normally effective under control of said carriage by means of said tappet to automatically operate said type device when the carriage reaches said place, a silencing key, and means, conditioned by operating said silencing key, to prevent co-operation of said tappet and said type-device operating means, said silencing key being usable at will preparatory to typing by means of said conventional types at said place, and said conditioned means being restorable at will.

15. In a typewriting and date-printing mechanism of the character described, the combination with a letter-feeding carriage, of a date-type, a tappet on the carriage, a jack displaceable by said tappet when the carriage reaches a predetermined date-printing place, a power operator for said date-type, connections co-operative with said displaced jack to connect said date-type to said power operator for a resulting date-printing stroke of said type, a silencing key, and means co-operative with said silencing key to disrupt said connections to predetermine non-operation of said date-type at said place.

16. In a typewriting and date-printing mechanism of the character described, the combination with a letter-feeding carriage, of a date-type, a tappet on the carriage, a jack displaceable by said tappet when the carriage reaches a predetermined date-printing place, a power operator for said date-type, connections co-operative with said displaced jack to connect said date-type to said power operator for a resulting date-printing stroke of said type, a silencing key, means co-operative with said silencing key to disrupt said connections to predetermine non-operation of said date-type at said place, and a latch automatically effective upon operation of said key to maintain said connections in disrupted condition, said latch being trippable at will for restoring said connections.

17. A typewriter arranged to automatically print a date at a predetermined place in the typing-line, including, in combination, a typewriter carriage and its letter-feed escapement-mechanism, a type-carrier and types thereon, said type-carrier operable in a single printing stroke to effect a date-imprint covering a plurality of letter-spaces, and means automatically operative under control of said carriage at a predetermined zone in its range of letter-feed travel to effect said operation of said date type-carrier and to incidentally operate said escapement-mechanism repeatedly for said plurality of letter-spaces.

18. A machine constructed according to claim 17, said means including a unit on the carriage embodying a controller for the type-carrier operation and a controller for the escape-mechanism operation, and a supporting rack on said carriage for said unit, the latter being adjustable along said rack to variably predetermine said zone relatively to different forms of work-sheets.

19. A typewriter arranged to automatically print a date at a predetermined place on the typing line, said date covering a plurality of letter-spaces in that it includes a given month and day, said typewriter including, in combination, a typewriter carriage and its letter-feed escapement-mechanism, a complement of date-printing types, and means automatically operative solely under control of said carriage at a predetermined zone in its range of letter-feed travel to automatically operate said complement of types and to incidentally operate said escapement-mechanism for said plurality of letter-spaces.

20. A typewriting machine having a date-printing mechanism including, in combination, a typewriter carriage, a letter-feed escapement-mechanism therefor, a type-carrier having a plurality of types to effect at a single printing stroke a date-imprint covering a plurality of letter-spaces, a power-operable rotary snatch-roll journaled in the frame of the machine, means operable under control of the carriage at a predetermined date-printing zone to operatively connect said date-type to said snatch-roll to effect said date-imprint, and means operable under control of said carriage at said date-zone to operatively connect said escapement-mechanism to said snatch-roll to work said escapement-mechanism repeatedly to automatically advance said carriage for said plurality of letter-spaces covered by the date-imprint.

21. In a date-printing machine of the character described, having a carriage and a letter-feed mechanism therefor, the combination with a jack operable to cause a certain complement of date-printing type to effect at a single printing stroke a date-imprint covering a plurality of letter-spaces, a jack operable to cause an operation of said escapement-mechanism to advance the carriage for said plurality of letter-spaces, of a tappet unit on the carriage having a tappet to engage the date-type-operation-controlling jack, said unit also having a tappet to engage the escapement-operation-controlling jack.

22. A machine constructed according to claim 21, said escapement-controlling tappet having a dwell to keep said escapement-controlling jack depressed for effecting a predetermined number of letter-spaces.

23. A machine constructed according to claim 21, said escapement-controlling tappet being divided into a primary tappet for engaging said escapement-controlling jack to effect a predetermined primary part of said plurality of letter-spaces preparatory to the date-printing operation and a secondary tappet to engage said escapement-controlling jack to effect the remaining part of said plurality of letter-spaces after the date-printing operation.

24. In a typewriting machine having a carriage and letter-feed escapement-mechanism therefor, the combination with tabulating mechanism for the carriage, a date-type carrier operable in a single printing stroke to effect a date-imprint, a tappet placed on the carriage for a date-printing zone, and operating means, including a jack engaged by said tappet, to operate said date-type carrier, of means automatically effective, in response to operation of said tabulating mechanism to skip the date zone, to prevent effective co-operation of said tappet and jack, so that the carriage as it moves through the date zone to skip the latter does not cause operation of said date-type carrier.

25. In a typewriting machine having a carriage, letter-feed escapement-mechanism therefor, the combination with tabulating mechanism for the carriage, a date-type carrier operable in a single printing stroke to effect a date-imprint covering a plurality of letter-spaces, tappet means placed on the carriage for a date-printing zone, and operating means, including jack devices engaged by said tappet means, to operate said date-type carrier and to also operate said escapement-mechanism repeatedly for said plurality of spaces, of means automatically effective, in response to operation of said tabulating mechanism operated to skip the date zone, to prevent effective co-operation of said tappet means and jack devices, so that the carriage, as it moves through the date zone to skip the latter, does not cause operation of said date-type carrier or of escapement-mechanism.

26. In a machine of the character described, the combination with typewriter mechanism having individually operable types, a carriage, and escapement-mechanism coacting with said types so that at each individual operation of a type said carriage is advanced a single-letter-space step, of tappet means, connected to said carriage, and means operative solely under control of said tappet-means at a predetermined place in the carriage travel to automatically effect a predetermined number of operations of said escapement-mechanism in succession and independently of said types, whereby said carriage is advanced a plurality of letter-space steps between two sequential operations of said types, said plurality of letter-space steps being additional to the letter-space step occurring at the first of said two sequential type operations.

27. In a machine of the character described, the combination with typewriter mechanism having individually operable types, a carriage, and escapement-mechanism coacting with said types so that at each individual operation of a type said carriage is advanced a single-letter-space step, of tappet-means connected to said carriage, means operative solely under control of said tappet-means at a predetermined place in the carriage travel to automatically effect a predetermined number of operations of said escapement-mechanism in succession and independently of said types, whereby said carriage is advanced a plurality of letter-space steps between two sequential operations of said types, said plurality of letter-space steps being additional to the letter-space step occurring at the first of said two sequential type operations, other tappet-means connected to said carriage, and means operative under the control of said other tappet-means for automatically effecting the second one of said two type operations by a predetermined type and in sequence with said plurality of letter-space steps of said carriage.

28. In a machine of the character described, the combination with typewriter mechanism having individually operable types, a carriage, and escapement-mechanism coacting with said types so that at each individual operation of a type said carriage is advanced a single-letter-space step, of tappet-means connected to said carriage, means operative solely under control of said tappet-means at a predetermined place in the carriage travel to automatically effect a predetermined number of operations of said escapement-mechanism in succession and independently of said types, whereby said carriage is advanced a plurality of letter-space steps between two sequential operations of said types, said plurality of letter-space steps being additional to the letter-space step occurring at the first of said two sequential type operations, other tappet-means connected to said carriage, and means operative under the control of said other tappet-means for automatically effecting the second one of said two type operations by a predetermined type and in sequence with said plurality of letter-space steps of said carriage, the escapement-controlling tappet-means and the type-controlling tappet-means being relatively arranged so that the automatic operation of said type occurs before said plurality of letter-space steps of said carriage.

29. In a machine of the character described, the combination with typewriter mechanism having individually operable types, a carriage, and escapement-mechanism coacting with said types so that at each individual operation of a type said carriage is advanced a single-letter-space step, of tappet-means connected to said carriage, means operative solely under control of said tappet-means at a predetermined place in the carriage travel to automatically effect a predetermined number of operations of said escapement-mechanism in succession and independently of said types, whereby said carriage is advanced a plurality of letter-space steps between two sequential operations of said types, said plurality of letter-space steps being additional to the letter-space step occurring at the first of said two sequential type operations, other tappet-means connected to said carriage, and means operative under the control of said other tappet-means for automatically effecting the second one of said two type operations by a predetermined type and in sequence with said plurality of letter-space steps of said carriage, the escapement-controlling tappet means and the type-controlling tappet-means being relatively arranged so that the automatic operation of said type occurs after said plurality of letter-space steps of said carriage.

30. In a typewriting machine, the combination with a reciprocatory typewriter-carriage, mechanism to advance said carriage, and power-operable mechanism conditionable to return said carriage and restorable to end the carriage-return movement, of a date-typing mechanism including means automatically operative at a predetermined zone in the carriage advance to print at a single printing stroke a date covering a plurality of letter-spaces and to work said escapement-mechanism to advance said carriage for said plurality of letter-spaces, said date-typing mechanism also including a control jack and a jack-engaging tappet on the carriage normally in operative relation pending their co-operation in a date zone, and means, responsive to said conditioning of said carriage-return mechanism, to disable the operative relation of said jack and tappet and, responsive to said restoration of said carriage-return mechanism, to restore said operative relation.

31. In a typewriting machine having individually operable types printing at a common printing point, the combination with a carriage and letter-feed escapement-mechanism therefor cooperative with said types, of a group of types operable collectively in a single printing stroke to effect a date-imprint extending a plurality of letter-spaces to the left and a plurality of letter-spaces to the right of said printing point, and means operative under control of the carriage, as the latter reaches a predetermined letter-space position by operation of one of said first-mentioned types, to work said escapement-mechanism repeatedly to automatically advance the carriage consonantly with said plurality of letter-spaces of the date-imprint extent at the left of said printing point, said automatic carriage advance being preparatory to operating said group of date-types and said means then, following the date-type operation, operating under control of the carriage to work said escapement repeatedly to automatically advance said carriage consonantly with said plurality of letter-spaces of the date-imprint extent at the right of said printing point.

32. In a typing machine having types individually operable to print at a common printing point, the combination with a carriage, and a letter-spacing mechanism for said carriage cooperative with said types, of a type device actuatable in a single stroke to effect an imprint covering a plurality of letter spaces, carriage-controlled means operable to actuate said type device at a predetermined zone in the carriage travel, tappet means operatively connected to said carriage to move therewith, and means operative under the control of said tappet means at said predetermined zone in the carriage travel to actuate said letter-spacing mechanism repeatedly to automatically advance said carriage for said plurality of letter spaces consonantly with the operation of said typing device.

33. In a typing machine having types individually operable to print at a common printing point, the combination with a carriage, and a letter-spacing mechanism for said carriage cooperative with said types, of a type device actuatable in a single stroke to effect an imprint covering a plurality of letter spaces, carriage-controlled means operable to actuate said type device at a predetermined zone in the carriage travel, tappet means operatively connected to said carriage to move therewith, and means operative under the control of said tappet means at said predetermined zone in the carriage travel to actuate said letter-spacing mechanism repeatedly to automatically advance said carriage for said plurality of letter spaces consonantly with the operation of said typing device, said tappet means and the means operative under the control thereof being relatively adjustable to changeably predetermine said zone.

34. In a typing machine having types individually operable to print at a common printing point, the combination of a carriage, a letter-feed mechanism for said carriage cooperative with said types, a type device operable in a single stroke to effect an imprint covering a plurality of letter spaces, said imprint being effected at a predetermined zone in the carriage travel, two tappet devices operatively connected to said carriage to move therewith, a power device, means operative under control of one of said tappet devices at said zone to cause said power device to actuate said type device, and means operative under control of the other tappet device at said zone to cause said power device to actuate said letter-feed mechanism repeatedly in correspondence to said plurality of letter spaces.

35. In a typing machine having types individually operable to print at a common printing point, the combination of a carriage, a letter-feed mechanism for said carriage cooperative with said types, a type device operable in a single stroke to effect an imprint covering a plurality of letter spaces, said imprint being effected at a predetermined zone in the carriage travel, two tappet devices operatively connected to said carriage to move therewith, a power device, means operative under control of one of said tappet devices at said zone to cause said power device to actuate said type device, and means operative under control of the other tappet device at said zone to cause said power device to actuate said letter feed mechanism repeatedly in correspondence to said plurality of letter spaces, said tappet-devices and the means operative under control thereof being relatively adjustable to changeably predetermine said zone.

36. In a typing machine, the combination of an extra wide type operable to print over a plurality of letter spaces at a single stroke, a typing carriage, a letter-spacing mechanism actuatable once concomitantly with said type and also independently of said type for advancing said carriage in a letter-spacing step at each actuation, a power device operable for actuating said type, a power device operable for actuating said letter-spacing mechanism independently without typing, and two control means, one for each power device, operative under control of the carriage at a predetermined zone of the carriage travel to effect automatically successive operations of both of said power devices, the control means for the power device for the letter-spacing mechanism having means for causing repeated actuations of said latter power device consonantly with said plurality of letter spaces.

HENRY L. PITMAN.